United States Patent
Moro

(10) Patent No.: US 6,606,172 B1
(45) Date of Patent: Aug. 12, 2003

(54) IMAGE INFORMATION PROCESSING APPARATUS, IMAGE INFORMATION PROCESSING METHOD AND IMAGE FORMING APPARATUS

(75) Inventor: Akihiro Moro, Kawasaki (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/381,660

(22) PCT Filed: Jan. 21, 1999

(86) PCT No.: PCT/JP99/00209

§ 371 (c)(1),
(2), (4) Date: Sep. 22, 1999

(30) Foreign Application Priority Data

Jan. 22, 1998 (JP) ............................................ 10-010418

(51) Int. Cl.[7] .................................................. H04N 1/40
(52) U.S. Cl. ........................ 358/483; 358/406; 358/474
(58) Field of Search ................................. 358/482, 483, 358/514, 513, 512, 406, 504, 474; 250/208.1; 355/41

(56) References Cited

U.S. PATENT DOCUMENTS

| | | | | |
|---|---|---|---|---|
| 4,751,377 A | | 6/1988 | Ishizaka et al. ............. | 250/205 |
| 5,241,404 A | * | 8/1993 | Furukawa et al. ........... | 358/483 |
| 5,390,032 A | | 2/1995 | Yamamoto et al. ......... | 358/474 |
| 6,204,910 B1 | * | 3/2001 | Iwai ............................ | 358/483 |
| 6,288,797 B1 | * | 9/2001 | Ueno .......................... | 358/443 |
| 6,292,594 B1 | * | 9/2001 | Iwai ............................ | 382/298 |

FOREIGN PATENT DOCUMENTS

| | | | |
|---|---|---|---|
| EP | 0878958 A2 | * 11/1998 | .......... H04N/1/401 |
| JP | 62-49782 | 3/1987 | |
| JP | 4-68868 | 3/1992 | |
| JP | 5-103196 | 4/1993 | |
| JP | 5-191575 | 7/1993 | |
| JP | 5-211610 | 8/1993 | |
| JP | 8-251355 | 9/1996 | |

* cited by examiner

*Primary Examiner*—Cheukfan Lee
(74) *Attorney, Agent, or Firm*—Foley & Lardner

(57) ABSTRACT

In an image processing apparatus using a four-channel output CCD, a deviation in left-and-right CCD characteristics is detected and the deviation is corrected, thereby to reproduce uniform image density free from a density error between left and right portions of a screen with respect to a center of the screen. A gray-scale pattern image is read by a scanner in a gray-scale pattern read-out mode. Deviations in left and right CCD portions are detected for respective gray scales of the gray-scale pattern image. In accordance with the magnitude of the deviations, a correction amount is determined. The correction amount is set in a left-and-right correction circuit whereby image density correction is made for each gray scale.

5 Claims, 16 Drawing Sheets

IMAGE INFORMATION PROCESSING APPARATUS, IMAGE INFORMATION PROCESSING METHOD AND IMAGE FORMING APPARATUS

TECHNICAL FIELD

The present invention relates to an image information processing apparatus and an image information processing method for processing electric signals from a four-channel output CCD, which receives optical image information from, e.g. a document, and outputs electric signals, and to an image forming apparatus such as an electronic copying machine for forming images, which includes this image formation processing apparatus.

BACKGROUND ART

Recently, image forming apparatuses such as digital copying machines have been widely used more and more. An increasing number of such digital copying machines have used CCDs capable of high-resolution reading and laser optical units realizing image-quality enhancing processing and high-resolution laser driving.

Besides, there is a demand for high-speed digital copying machines which replace high-speed analog copying machines, and there is a need for devices for realizing higher-speed, higher-resolution processing.

As one type of such devices, CCDs capable of realizing high-speed, high-resolution processing have been developed and begun to be put on the market as products.

Such high-speed CCDs have already been used as four-channel output CCDs for achieving high-speed operations, and pre-processing systems using such four-channel output CCDs have been proposed.

Compared to pre-processing systems using conventional two-channel output CCDs, pre-processing systems using high-speed four-channel output CCDs are constructed such that right and left data of output signals from the CCD are output simultaneously and a left-side even component OS2, a left-side odd component OS1, a right-side even component OS4 and a right-side odd component OS3 are processed through the same signal transmission path (processing path).

In a signal amplification processing AMP in the pre-processing system, left-side and right-side even components and odd components are signal-amplified, synthesized and AD-conversion (ADC)-processed. The resultant image signals are input to a high-speed scanner control ASIC in the form of 1 pixle/8 bit digital signals with two channels of even component DOBx and odd components DOAx.

The two-channel signals of even components DOBx and odd components DOAx input to the high-speed scanner control ASIC are processed as four-channel signals in order to decrease a processing speed with bus-width conversion and to perform a shading correction for correcting a density gradient deviation occurring in each pixel of image data with respect to image density.

Thereafter, shading-corrected image data is bit inverted, and the order of the image data is rectified by raster-conversion. Then, in order to change the internal high processing speed to a low transfer speed, the image data is transferred in units of four pixels to an image processing ASIC.

In the image processing ASIC, the image data is converted to image data of one pixel unit. Then, the image data is subjected to a series of system correction processes by image processing such as filtering processing, range correction processing, magnification conversion (enlargement, reduction) processing, density conversion processing and gray-scale processing.

As regards comparison in signal output construction of the CCDs, in the case of the conventional two-channel output CCD, if the order of output image signals for one line of the CCD is considered, these two outputs are delivered in the state in which the even components and odd components are arranged from the left-end pixel signal (proper order for image processing). On the other hand, in the case of the present high-speed CCD, i.e. four-channel output CCD, if the order of output image signals for one line of the CCD is considered, the four-channel outputs are delivered such that the left-side outputs of both even components and odd components are delivered in order from the left-end pixel signal to the central image signal at last, and the right-side outputs are delivered in order from the right-end pixel signal to the central pixel signal at last. Thus, the signals are not well arranged (improper order for image processing).

As stated above, the four-channel output CCD is used dividedly for left and right components and odd and even components in the main scan direction. In the case of the conventional two-channel output CCD, a variance in characteristics of transfer paths after shading for odd and even components can be suppressed and corrected to a problem-free level through subsequent image processing using a low-pass filter (LPF) or error diffusion processing. In the case of the four-channel output CCD, however, a variance in left-and-right CCD sensitivity characteristics appears on image data after shading correction processing. Such a variance cannot be suppressed and corrected by the conventional image processing alone. To cope with this, a correction circuit is provided for left and right image data before image processing.

The correction circuit for left and right image data is necessary since sensor characteristics differ between the left and right in the main scan direction due to the pre-processing system configuration using the four-channel output CCD to achieve high-speed operation. However, no technique has been made clear for adjusting the correction methods in the left and right correction circuits. It should be noted, however, that unless correction for the left and right is made, a variance in CCD characteristics differs between the left and right due to a difference in CCD devices, and a difference among devices increases with respect to image density reproduction.

As has been described above, where the four-channel CCD is used to achieve high-speed operation, the correction circuit is required since the sensor characteristics differ between the left and right in the main scan direction due to the pre-processing system configuration. However, adjustment for the correction method of the left and right correction circuit has not yet been clear. Unless correction for the left and right is made, a variance in CCD characteristics differs between the left and right due to a difference in CCD devices, and a difference among devices increases with respect to image density reproduction.

DISCLOSURE OF INVENTION

The object of the present invention is to provide an image information processing apparatus, an image information processing method and an image forming apparatus, wherein when a four-channel output CCD is used, a left and right correction circuit in which adjustment for correction is made clear is used for correction, whereby a variance in CDD characteristics of the left and right due to a difference in CCD devices is eliminated and a stable image density free of a density error between the left and right devices can be reproduced.

The present invention provides an image information processing apparatus for performing an information process on information read by a four-channel output CCD, the apparatus comprising: accumulation means for receiving optical image information and accumulating photoelectrically converted electric signals in a one-line element; a four-channel output CCD having an output section for outputting the electric signals accumulated in the accumulation means from a first end portion of the one-line element at even intervals, an output section for outputting the electric signals accumulated in the accumulation means from the first end portion of the one-line element at odd intervals, an output section for outputting the electric signals accumulated in the accumulation means from a second end portion of the one-line element at even intervals, and an output section for outputting the electric signals accumulated in the accumulation means from the second end portion of the one-line element at even intervals; correction amount determination means for comparing the electric signals from the first end portion, received from the four-channel output CCD, and the electric signals from the second end portion, detecting a deviation, and determining a correction amount on the basis of the deviation; and correction means for correcting the deviation between the electric signals from the first end portion of the four-channel output CCD and the electric signals from the second end portion, on the basis of the correction amount determined by the correction amount determination means.

The present invention also provides an image information processing apparatus for performing an information process on information read by a four-channel output CCD, the apparatus comprising: accumulation means for receiving optical image information and accumulating photoelectrically converted electric signals in a one-line element; a four-channel output CCD having an output section for outputting the electric signals accumulated in the accumulation means from a first end portion of the one-line element at even intervals, an output section for outputting the electric signals accumulated in the accumulation means from the first end portion of the one-line element at odd intervals, an output section for outputting the electric signals accumulated in the accumulation means from a second end portion of the one-line element at even intervals, and an output section for outputting the electric signals accumulated in the accumulation means from the second end portion of the one-line element at even intervals; correction amount determination means for comparing the electric signals from the first end portion, received from the four-channel output CCD, and the electric signals from the second end portion, detecting a deviation, and determining a correction amount on the basis of the deviation; and correction means for correcting either the electric signals from the first end portion or the electric signals from the second end portion, on the basis of the correction amount determined by the correction amount determination means, thereby to correct the deviation.

The invention also provides an image information processing apparatus for performing an information process on information read by a four-channel output CCD, the apparatus comprising: accumulation means for reading an image on a pattern document having a plurality of gray scales and accumulating photoelectrically converted electric signals of the image in a one-line element; a four-channel output CCD having an output section for outputting the electric signals accumulated in the accumulation means from a first end portion of the one-line element at even intervals, an output section for outputting the electric signals accumulated in the accumulation means from the first end portion of the one-line element at odd intervals, an output section for outputting the electric signals accumulated in the accumulation means from a second end portion of the one-line element at even intervals, and an output section for outputting the electric signals accumulated in the accumulation means from the second end portion of the one-line element at even intervals; correction amount determination means for comparing the electric signals from the first end portion, received from the four-channel output CCD, and the electric signals from the second end portion, detecting deviations for the respective gray scales of the pattern document, and determining a correction amount on the basis of the deviations; and correction means for correcting the deviations between the electric signals from the first end portion of the four-channel output CCD and the electric signals from the second end portion, on the basis of the correction amount determined by the correction amount determination means.

The present invention also provides an image information processing apparatus for performing an information process on information read by a four-channel output CCD, the apparatus comprising: accumulation means for reading an image on a pattern document having a plurality of gray scales and accumulating photoelectrically converted electric signals of the image in a one-line element; a four-channel output CCD having an output section for outputting the electric signals accumulated in the accumulation means from a first end portion of the one-line element at even intervals, an output section for outputting the electric signals accumulated in the accumulation means from the first end portion of the one-line element at odd intervals, an output section for outputting the electric signals accumulated in the accumulation means from a second end portion of the one-line element at even intervals, and an output section for outputting the electric signals accumulated in the accumulation means from the second end portion of the one-line element at even intervals; correction amount determination means for comparing the electric signals from the first end portion, received from the four-channel output CCD, and the electric signals from the second end portion, detecting deviations for the respective gray scales of the pattern document, finding an average of the deviations and determining the average value to be a correction amount; and correction means for correcting the deviations between the electric signals from the first end portion of the four-channel output CCD and the electric signals from the second end portion, on the basis of the correction amount determined by the correction amount determination means.

The invention also provides an image information processing method for performing an information process on information read by a four-channel output CCD, the method comprising: an accumulation step for receiving optical image information and accumulating photoelectrically converted electric signals in a one-line element; a four-channel output step using a four-channel output CCD and having an output step for outputting the electric signals accumulated in the accumulation step from a first end portion of the one-line element at even intervals, an output step for outputting the electric signals accumulated in the accumulation step from the first end portion of the one-line element at odd intervals, an output step for outputting the electric signals accumulated in the accumulation step from a second end portion of the one-line element at even intervals, and an output step for outputting the electric signals accumulated in the accumulation step from the second end portion of the one-line element at even intervals; a correction amount determination step for comparing the electric signals from the first end portion, output in the four-channel output step, and the electric signals from the second end portion, detecting a deviation, and determining a correction amount on the basis of the deviation; and a correction step for correcting the deviation between the electric signals from the first end portion of the four-channel output CCD and the electric signals from the second end portion, on the basis of the correction amount determined by the correction amount determination step.

The invention also provides an image information processing method for performing an information process on information read by a four-channel output CCD, the method comprising: an accumulation step for receiving optical image information and accumulating photoelectrically converted electric signals in a one-line element; a four-channel output CCD having an output step for outputting the electric signals accumulated in the accumulation step from a first end portion of the one-line element at even intervals, an output step for outputting the electric signals accumulated in the accumulation step from the first end portion of the one-line element at odd intervals, an output step for outputting the electric signals accumulated in the accumulation step from a second end portion of the one-line element at even intervals, and an output step for outputting the electric signals accumulated in the accumulation step from the second end portion of the one-line element at even intervals; a correction amount determination step for comparing the electric signals from the first end portion, received from the four-channel output CCD, and the electric signals from the second end portion, detecting a deviation, and determining a correction amount on the basis of the deviation; and a correction step for correcting either the electric signals from the first end portion or the electric signals from the second end portion, on the basis of the correction amount determined by the correction amount determination means, thereby to correct the deviation.

The invention also provides an image information processing method for performing an information process on information read by a four-channel output CCD, the method comprising: an accumulation step for reading an image on a pattern document having a plurality of gray scales and accumulating photoelectrically converted electric signals of the image in a one-line element; a four-channel output step having an output step for outputting the electric signals accumulated in the accumulation step from a first end portion of the one-line element at even intervals, an output step for outputting the electric signals accumulated in the accumulation step from the first end portion of the one-line element at odd intervals, an output step for outputting the electric signals accumulated in the accumulation step from a second end portion of the one-line element at even intervals, and an output step for outputting the electric signals accumulated in the accumulation step from the second end portion of the one-line element at even intervals; a correction amount determination step for comparing the electric signals from the first end portion, output from the four-channel output, and the electric signals from the second end portion, detecting deviations for the respective gray scales of the pattern document, and determining a correction amount on the basis of the deviations; and a correction step for correcting the deviations between the electric signals from the first end portion of the four-channel output CCD and the electric signals from the second end portion, on the basis of the correction amount determined by the correction amount determination step.

The present invention also provides an image information processing method for performing an information process on information read by a four-channel output CCD, the method comprising: an accumulation step for reading an image on a pattern document having a plurality of gray scales and accumulating photoelectrically converted electric signals of the image in a one-line element; a four-channel output step having an output step for outputting the electric signals accumulated in the accumulation step from a first end portion of the one-line element at even intervals, an output step for outputting the electric signals accumulated in the accumulation step from the first end portion of the one-line element at odd intervals, an output step for outputting the electric signals accumulated in the accumulation step from a second end portion of the one-line element at even intervals, and an output step for outputting the electric signals accumulated in the accumulation step from the second end portion of the one-line element at even intervals; a correction amount determination step for comparing the electric signals from the first end portion, output in the four-channel output step, and the electric signals from the second end portion, detecting deviations for the respective gray scales of the pattern document, finding an average value of the deviations, and determining the average value to be a correction amount; and a correction step for correcting the deviations between the electric signals from the first end portion of the four-channel output CCD and the electric signals from the second end portion, on the basis of the correction amount determined by the correction amount determination step.

The present invention also provides an image forming apparatus for performing an information process on information read by a four-channel output CCD, the apparatus comprising: accumulation means for receiving optical image information and accumulating photoelectrically converted electric signals in a one-line element; a four-channel output CCD having an output section for outputting the electric signals accumulated in the accumulation means from a first end portion of the one-line element at even intervals, an output section for outputting the electric signals accumulated in the accumulation means from the first end portion of the one-line element at odd intervals, an output section for outputting the electric signals accumulated in the accumulation means from a second end portion of the one-line element at even intervals, and an output section for outputting the electric signals accumulated in the accumulation means from the second end portion of the one-line element at even intervals; correction amount determination means for comparing the electric signals from the first end portion, received from the four-channel output CCD, and the electric signals from the second end portion, detecting a deviation, and determining a correction amount on the basis of the deviation; correction means for correcting the deviation between the electric signals from the first end portion of the four-channel output CCD and the electric signals from the second end portion, on the basis of the correction amount determined by the correction amount determination means; and image forming means for forming an image on a recording medium on the basis of the electric signals corrected by the correction means.

This invention also provides an image forming apparatus for performing an information process on information read by a four-channel output CCD, the apparatus comprising: accumulation means for receiving optical image information and accumulating photoelectrically converted electric signals in a one-line element; a four-channel output CCD having an output section for outputting the electric signals accumulated in the accumulation means from a first end portion of the one-line element at even intervals, an output section for outputting the electric signals accumulated in the accumulation means from the first end portion of the one-line element at odd intervals, an output section for outputting the electric signals accumulated in the accumulation means from a second end portion of the one-line element at even intervals, and an output section for outputting the electric signals accumulated in the accumulation means from the second end portion of the one-line element at even intervals; correction amount determination means for comparing the electric signals from the first end portion, received from the four-channel output CCD, and the electric signals from the second end portion, detecting a deviation, and determining a correction amount on the basis of the deviation; correction means for correcting either the electric signals from the first end portion or the electric signals from the second end portion, on the basis of the correction amount determined by the correction amount determination means, thereby to correct the deviation; and image forming means for forming an image on a recording medium on the basis of the electric signals corrected by the correction means.

The present invention also provides an image forming apparatus for performing an information process on information read by a four-channel output CCD, the apparatus comprising: accumulation means for reading an image on a pattern document having a plurality of gray scales and accumulating photoelectrically converted electric signals of the image in a one-line element; a four-channel output CCD having an output section for outputting the electric signals accumulated in the accumulation means from a first end portion of the one-line element at even intervals, an output section for outputting the electric signals accumulated in the accumulation means from the first end portion of the one-line element at odd intervals, an output section for outputting the electric signals accumulated in the accumulation means from a second end portion of the one-line element at even intervals, and an output section for outputting the electric signals accumulated in the accumulation means from the second end portion of the one-line element at even intervals; correction amount determination means for comparing the electric signals from the first end portion, received from the four-channel output CCD, and the electric signals from the second end portion, detecting deviations for the respective gray scales of the pattern document, and determining a correction amount on the basis of the deviations; correction means for correcting the deviations between the electric signals from the first end portion of the four-channel output CCD and the electric signals from the second end portion, on the basis of the correction amount determined by the correction amount determination means; and image forming means for forming an image on a recording medium on the basis of the electric signals corrected by the correction means.

The present invention also provides an image forming apparatus for performing an information process on information read by a four-channel output CCD, the apparatus comprising: accumulation means for reading an image on a pattern document having a plurality of gray scales and accumulating photoelectrically converted electric signals of the image in a one-line element; a four-channel output CCD having an output section for outputting the electric signals accumulated in the accumulation means from a first end portion of the one-line element at even intervals, an output section for outputting the electric signals accumulated in the accumulation means from the first end portion of the one-line element at odd intervals, an output section for outputting the electric signals accumulated in the accumulation means from a second end portion of the one-line element at even intervals, and an output section for outputting the electric signals accumulated in the accumulation means from the second end portion of the one-line element at even intervals; correction amount determination means for comparing the electric signals from the first end portion, received from the four-channel output CCD, and the electric signals from the second end portion, detecting deviations for the respective gray scales of the pattern document, finding an average of the deviations and determining the average value to be a correction amount; correction means for correcting the deviations between the electric signals from the first end portion of the four-channel output CCD and the electric signals from the second end portion, on the basis of the correction amount determined by the correction amount determination means; and image forming means for forming an image on a recording medium on the basis of the electric signals corrected by the correction means.

Best Mode of Carrying Out the Invention

An embodiment of the present invention will now be described with reference to the accompanying drawings.

Figure 1:
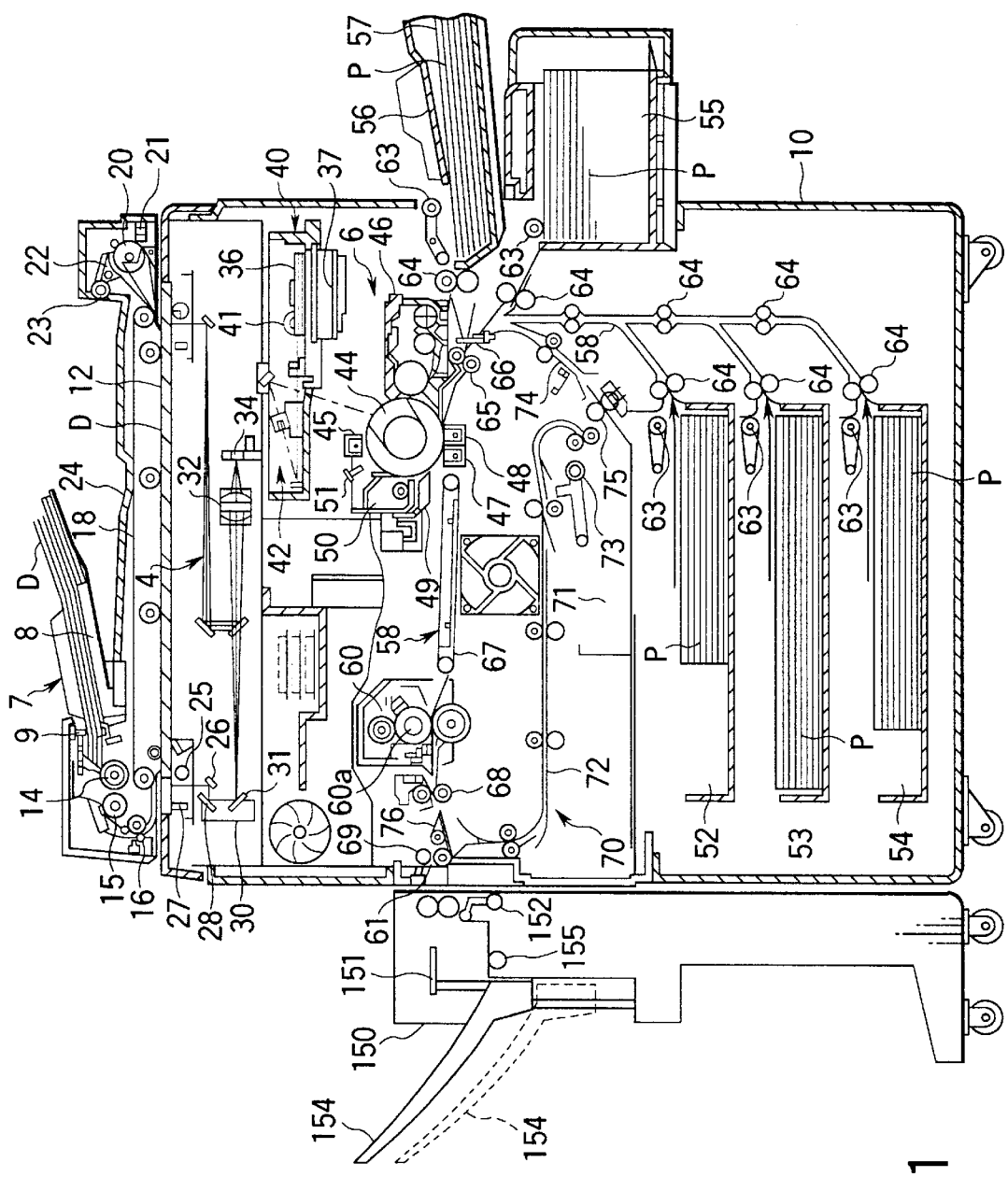
FIG. 1 is a cross-sectional view showing an internal structure of a digital copying machine according to an image forming apparatus of the present invention.

FIG. 1 is a cross-sectional view showing an internal structure of a digital copying machine (DPPC) according to an image forming apparatus of this embodiment, which uses a four-channel output CCD for achieving high-speed operations.

As is shown in FIG. 1, the digital copying machine has an apparatus body 10, and the apparatus body 10 includes a scanner unit 4 functioning as image read means and a printer unit 6 functioning as image forming means.

A document table 12 of a transparent glass, on which an object to be read, that is, a document D, is placed, is provided on a top face of the apparatus body 10. An automatic document feeder (hereinafter "ADF") 7 for automatically feeding the document onto the document table 12 is provided on the top face of the apparatus body 10. The ADF 7 is provided to be openable relative to the document table 12 and serves also as a document holder for putting the document D on the document table 12 in close contact with the document table 12.

The ADF 7 comprises a document tray 8 on which documents D are set, an empty sensor 9 for sensing the presence/absence of the document, a pick-up roller 14 for picking up the documents D from the document tray 8 one by one, a sheet feed roller 15 for feeding the picked-up document, an aligning roller pair 16 for aligning a forward end of the document, and a transfer belt 18 provided to cover almost the entirety of the document table 12. A plurality of documents set on the document tray 8 with their obverse sides placed upward are picked up from the lowermost one, that is, the last page. The picked-up document is aligned by the aligning roller pair 16 and brought to a predetermined position on the document table 12 by the transfer belt 18.

In the ADF 7, a reverse roller 20, a non-reverse sensor 21, a flapper 22 and a feed roller 23 are provided on an end portion opposite to the aligning roller pair 16 with the transfer belt 18 interposed. The document D, which has image information read by the scanner unit 4 (to be described later), is fed from the document table 12 by the transfer belt 18 and discharged onto a discharge section 24 on the upper face of the ADF 7 via the reverse roller 20, flapper 21 and discharge roller 22. When the reverse side of the document D is to be read, the flapper 22 is switched and the document D fed by the transfer belt 18 is reversed by the reverse roller 20. Then, the document D is brought to a predetermined position on the document table 12 by the transfer belt 18 once again.

The scanner unit 4 provided within the apparatus body 10 includes an exposure lamp 25, which serves as a light source for illuminating the document D placed on the document table 12, and a first mirror 26 for deflecting reflection light from the document D in a predetermined direction. These exposure lamp 25 and first mirror 26 are attached to a first carriage 27 provided below the document table 12.

The first carriage 27 is disposed to be movable in parallel to the document table 12. The first carriage 27 is reciprocally moved below the document table 12 by a scanning motor 35 (to be described later) via a toothed belt (not shown), etc.

A second carriage 28, which is movable in parallel to the document table 12, is provided below the document table 12. The second carriage 28 has second and third mirrors 30 and 31 disposed perpendicular to each other. The second and third mirrors 30 and 31 deflect in succession reflection light from the document D, which has been deflected by the first mirror 26. The second carriage 28 is driven by a toothed belt, etc., which drives the first carriage 27, relative to the first carriage 27. In addition, the second carriage 28 is moved in parallel to the document table 12 at half the speed of the first carriage.

A focusing lens 32 and a four-channel output CCD (photoelectric conversion element) 34 are provided below the document table 12. The focusing lens 32 focuses reflection light from the third mirror 31 on the second carriage 28. The four-channel output CCD 34 photoelectrically converts the reflection light focused by the focusing lens. The focusing lens 32 is disposed to be movable by a driving mechanism in a plane including an optical axis of light deflected by the third mirror 31. The focusing lens 32 itself moves to focus the reflection light at a desired magnification. The four-channel output CCD 34 photoelectrically converts incident reflection light and outputs an electric signal corresponding to the read document D.

On the other hand, the printer unit 6 includes a laser exposure device 40 functioning as latent image forming means. The laser exposure device 40 comprises a semiconductor laser 41 serving as a light source; a polygon mirror 36 serving as a scan member for successively deflecting a laser beam emitted from the semiconductor laser 41; a polygon motor 37 serving as a scan motor for rotating the polygon mirror 36 at a predetermined number of revolutions (to be described later); and an optical system 42 for deflecting the laser beam from the polygon mirror and guiding it to a photosensitive drum 44 (to be described later). The laser exposure device 40 with this structure is fixed to a support frame (not shown) of the apparatus body 10.

The semiconductor laser 41 is turned on/off in accordance with image information of the document D read by the scanner unit 4, facsimile transmission/reception document information, etc. The emitted laser beam is directed to the photosensitive drum 44 via the polygon mirror 36 and optical system 42. The peripheral surface of the photosensitive drum 44 is scanned by the laser beam, whereby a static latent image is formed on the peripheral surface of the photosensitive drum 44.

The printer unit 6 has the rotatable photosensitive drum 44 serving as an image carrier provided at a substantially central position in the apparatus body 10. The peripheral surface of the photosensitive drum 44 is exposed to the laser beam from the laser exposure device 40, and a desired static latent image is formed thereon. Around the photosensitive drum 44, there are integrally provided an electrifying charger 45 for electrifying the surface of the drum with a predetermined charge; a developer 46 for developing a static latent image formed on the peripheral surface of the photosensitive drum 44 with a desired image density by applying toner as developing agent to the static latent image; and a separating charger 47 for separating from the photosensitive drum 44 a transfer material, i.e. a copying sheet P, fed from a sheet cassette (to be described later). In addition, the photosensitive drum 44 is surrounded in succession by a transfer charger 48 for transferring a toner image formed on the photosensitive drum 44 onto the sheet P; a separating claw 49 for separating the copying sheet P from the peripheral surface of the photosensitive drum 44; a cleaner 50 for cleaning the toner remaining on the peripheral surface of the photosensitive drum 44 and a destaticizer 51 for deelectrifying the peripheral surface of the photosensitive drum 44.

In a lower part of the apparatus body 10, there are provided an upper cassette 52, a middle cassette 53 and a lower cassette 54 in a mutually stacked manner, which can be drawn from the apparatus body. Copying sheets of different sizes are loaded in the respective cassettes. A large-capacity feeder 55 is provided on a side of these cassettes. The large-capacity feeder 55 contains about 3000 copying sheets P of a frequently used size, e.g. A4 size. A feed cassette 57 serving also as a manual feed tray 56 is detachably mounted above the large-capacity feeder 55.

A transfer path 58 is formed within the apparatus body 10. The transfer path 58 extends from each cassette and large-capacity feeder 55 through a transfer section provided between the photosensitive drum 44 and transfer charger 48. A fixing device 60 having a fixing lamp 60a is provided at a terminal end of the transfer path 58. A discharge hole 61 is formed on a side wall of the apparatus body 10, which is opposed to the fixing device 60. A finisher 150 of a single tray is mounted at the discharge hole 61.

Pick-up rollers 63 for picking up sheets P one by one from the cassettes and large-capacity feeder are provided near the upper cassette 52, middle cassette 53 and lower cassette 54 and near feed cassette 57. The transfer path 58 is provided with a number of feed roller pairs 64 for transferring through the transfer path 58 the copying sheets P picked up by the pick-up rollers 63.

A register roller pair 65 is provided on an upstream side of the photosensitive drum 44 along the transfer path 58. The register roller pair 65 corrects a skew of the picked-up copying sheet P, aligns a forward end of the toner image on the photosensitive drum 44 with a forward end of the copying sheet P, and feeds the copying sheet P to the transfer section at the same speed as the speed of movement of the peripheral surface of the photosensitive drum 44. A pre-alignment sensor 66 for sensing arrival of the copying sheet P is provided in front of the register roller pair 65, that is, on the feed roller (64) side.

The copying sheet P picked up one by one by the pick-up roller 63 from each cassette or large-capacity feeder 55 is fed to the register roller pair 65 by means of the feed roller pair 64. The forward end of the copying sheet P is aligned by the register roller pair 65 and the copying sheet P is fed to the transfer section.

In the transfer section, a developing agent image, i.e. a toner image, formed on the photosensitive drum 44 is transferred onto the sheet P by the transfer charger 48. The copying sheet P, on which the toner image has been transferred, is separated from the peripheral surface of the photosensitive drum 44 by the functions of the separating charger 47 and separating claw 49 and then conveyed to the fixing device 60 via a convey belt 67 constituting a part of the transfer path 52. After the developing agent image is melted and fixed on the copying sheet P by the fixing device 60, the copying sheet P is discharged to the finisher 150 via the discharge hole 61 by means of a feed roller pair 68 and a discharge roller pair 69.

An automatic double-side device 70 is provided below the transfer path 58. The automatic double-side device 70 reverses the copying sheet P, which has passed through the fixing device 60, and feeds it back to the register roller pair 65. The automatic double-side device 70 comprises a temporary stacker 71 for temporarily stacking the copying sheet P; a reverse path 72 for reversing the copying sheet P, which has passed through the fixing device 60, and guiding it to the temporary stacker 71; a pick-up roller 73 for picking up copying sheets P one by one, which have been stacked in the temporary stacker; and a feed roller 75 for feeding the picked-up sheet to the register roller pair 65 via a transfer path 74. A sort gate 76 for selectively sorting the copying sheet P to the discharge hole 61 or to the reverse path 72 is provided at a branching portion between the transfer path 58 and reverse path 72.

When a double-side copying operation is performed, the copying sheet P which has passed through the fixing device 60 is guided to the reverse path 72 by the sort gate 76 and temporarily stacked in the temporary stacker 71 in the reversed state. Then, the copying sheet P is fed to the register roller pair 65 via the transfer path 74 by the pick-up roller 73 and feed roller pair 75. The copying sheet P, after aligned by the register roller pair 65, is fed to the transfer section once again and a toner image is transferred onto the reverse side of the copying sheet P. Thereafter, the copying sheet P is discharged to the finisher 150 via the transfer path 58, fixing device 60 and discharge roller 69.

The finisher 150 staples the discharged sheets in units of a copy. Each time one of copying sheets P to be stapled has been have been discharged from the discharge hole 61, it is shifted and aligned to a stapling side by a guide bar 151. After all copying sheets P to be stapled have been discharged, they are held by a hold arm 152 and stapled by a stapler unit (not shown). Then, the guide bar 151 lowers and each stapled copy of sheets P is discharged to a finisher discharge tray 154 by a finisher discharge roller 155. The degree of lowering of the finisher discharge tray 154 is approximately determined according to the number of copying sheets P, and the tray 154 is lowered stepwise each time each copy of sheets has been discharged. The guide bar 151 for aligning the discharged copying sheets P is positioned at such a level that the guide bar 151 may not contact the already stapled copying sheets P placed on the finisher discharge tray 154.

The finisher discharge tray 154 is connected to a shift mechanism (not shown) which shifts (e.g. in four directions of front, rear, right and left) in units of a copy in a sort mode.

An operation panel 380 for inputting various copying conditions, a copying operation start signal for starting a copying operation, etc. is provided on an upper front part of the apparatus body 10.

A control system of the digital copying machine will now be described with reference to FIG. 2.

The control system of the digital copying machine comprises three blocks in general, i.e. a base section 301, a page memory section 302 and an extension section 303. The base section 301 constitutes a digital copying machine, wherein the scanner unit 4 and printer unit 6 are connected by an image processing unit 5 via a base section system bus 312. The page memory section 302 receives and records image data from the base section 301 and transfers the recorded image data back to the base section 301, thereby realizing a memory copy (electronic sorting). The extension section 303 comprises a hard disk (HD) serving as a secondary memory for storing compression image data of the page memory section 302; a FAX board (G4/G3?FAX control means) 369 for transmitting image compression data with the outside via a public line; a LAN board (local area network line control means) 371 for transmitting data via a LAN; and a mother board comprising an extension section CPU 361 for controlling these elements via an extension system bus 373 and an ISA bus 374, a main memory 361a used by the extension section CPU 361, and a DMAC 362 for controlling DMA transfer on the ISA bus 374.

The base section 301 and page memory section 302 are connected by a base section system interface 316 for transmission of control data and a base section image interface 317 for transmission of image data. The page memory section 302 and extension section 303 are connected by an extension section system interface 376 for transmission of control data and an extension section image interface 377 for transmission of image data.

The base section 301 comprises input means (scanner unit) 4, output means (printer unit) 6, image processing unit 5 and control means (base section CPU) 311 connected to these elements via a base section system bus 312 to control these elements.

The scanner unit 4 has the aforementioned four-channel output CDD 34 comprising linearly arranged light-receiving elements (one-line CCDs). The scanner unit 4 reads an image of a document on the document table 12 line by line in accordance with an instruction from the base section CPU 311. After the gray scale of the read image is converted to 8-bit digital data, the data is output to the image processing unit 5 as lime-sequential digital data along with sync signals via a scanner interface (not shown).

The base section CPU 311 controls each means within the base section 301 and each means (described below) of the page memory section 302.

The page memory section 302 comprises system control means 304, including a communication memory 305, for controlling control information communication between the base section CPU 311 in the base section 301 and the extension section CPU 361 in the extension section 303 and controlling access to the page memory 323 by the base section 301 and extension section 303; memory means (page memory) 323 for temporarily storing image data; an address control unit 306 for generating addresses in the page memory 323; an image bus 320 for data transfer among devices in the page memory section 302; a control bus 321 for transferring control signals between the devices in the page memory section 302 and the system control means 304; data control means 307 for controlling data transfer when data transfer is effected between the page memory 323 and some other device via the image bus 320; image data I/F means 308 for interfacing image data when image data is transferred to the base section 301 via the base section image interface 317; resolution conversion/two-value rotation means 325 for converting, when image data is transmitted to a device with a different resolution, the resolution of image data in conformity with the device, or the resolution of image data received from a device with a different resolution in conformity to the resolution of the printer unit 6 of base section 301, or executing a 90°-rotation process for two-value image data; compression/extension means 324 for compressing input image data for devices, which transmits or stores compressed image data as in the case of facsimile transmission or optical disk storage, or for extending compressed image data for making it visible through the printer unit 6; and multi-value rotation memory 309 connected to the image data I/F means 308 and used when image data is rotated over 90° or −90° and output in a case where image data is output from the printer unit 6.

The extension section 303 comprises control means (extension section CPU) 361 for controlling respective devices (mentioned below) in the extension section 303 via an extension section system bus 373; a main memory 361*a* used by the extension section CPU 361; a general-purpose ISA bus 374; an ISA bus controller (ISA?B/C) 363 for interfacing the extension section system bus 373 and ISA bus 374; a DMA controller (DMAC) 362 for controlling data transfer on the ISA bus 374; storage means (HDD) 365, connected to the ISA bus 374, for electronically storing image data; an HD?FD interface (HD?FD I/F) 364 therefor; storage means (optical disk drive: ODD) 368, connected to the ISA bus 374, for electronically storing image data; an SCSI interface 367 therefor; local area network line control means (LAN) 371 for realizing a LAN function; printer controller means 370 for realizing a printer function; G4/G3?FAX control means 369 having a G4/G3?FAX control function; and an extension section image bus 375 for outputting image data from the printer controller means 370 to the page memory section 302 via the system image interface 377.

A hard disk HD built in the HDD 365 stores, as a file, compression image data of each document consisting of one or more pages, in a state in which the image data is managed with search data for searching for the document.

The aforementioned operation panel 80, which comprises a keyboard and a display for inputting instructions to the extension section 303, is connected to the extension section system bus 373.

The storage means (ODD) 368 is connected to the ISA bus 374 via the SCSI interface 367. The extension section CPU 361 controls the storage means 368 with use of SCSI commands via the extension section system bus 373, ISA?B/C 63 and ISA bus 374.

The image data I/F means (image data control means) 308 will now be described. The image data I/F means 308 performs via the image processing unit 5 image data transfer between the scanner unit 4 or printer unit 6 and the page memory 323 with the device on the image bus 320. The image data I/F means 308 also performs image data transfer between the printer controller 370, etc. connected to the extension section image bus 375 in the extension section 303 and the page memory 323.

The page memory 323 in the page memory section 302 has a large memory space.

Figure 2:
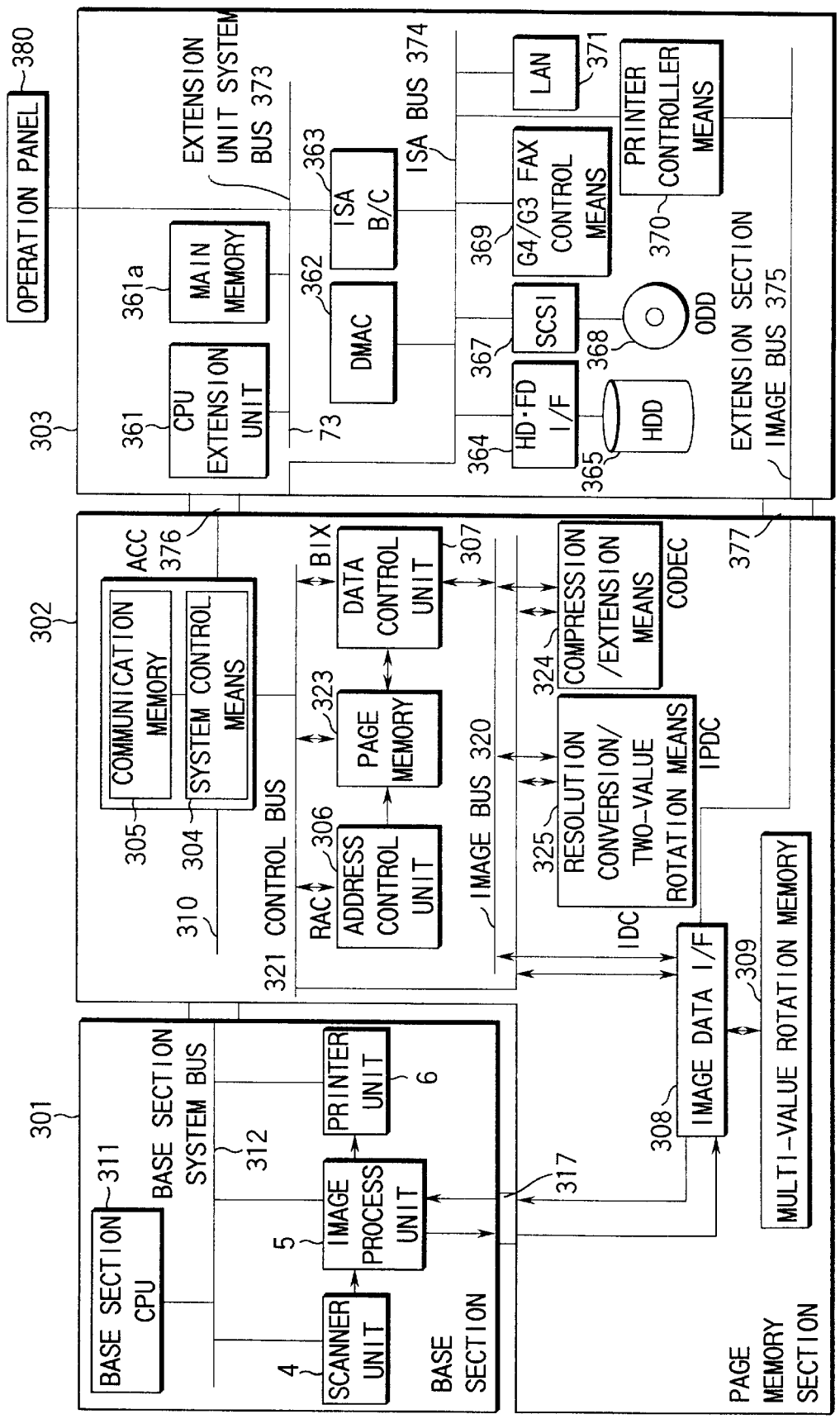
FIG. 2 is a block diagram showing a control system of the digital copying machine.
Figure 3:
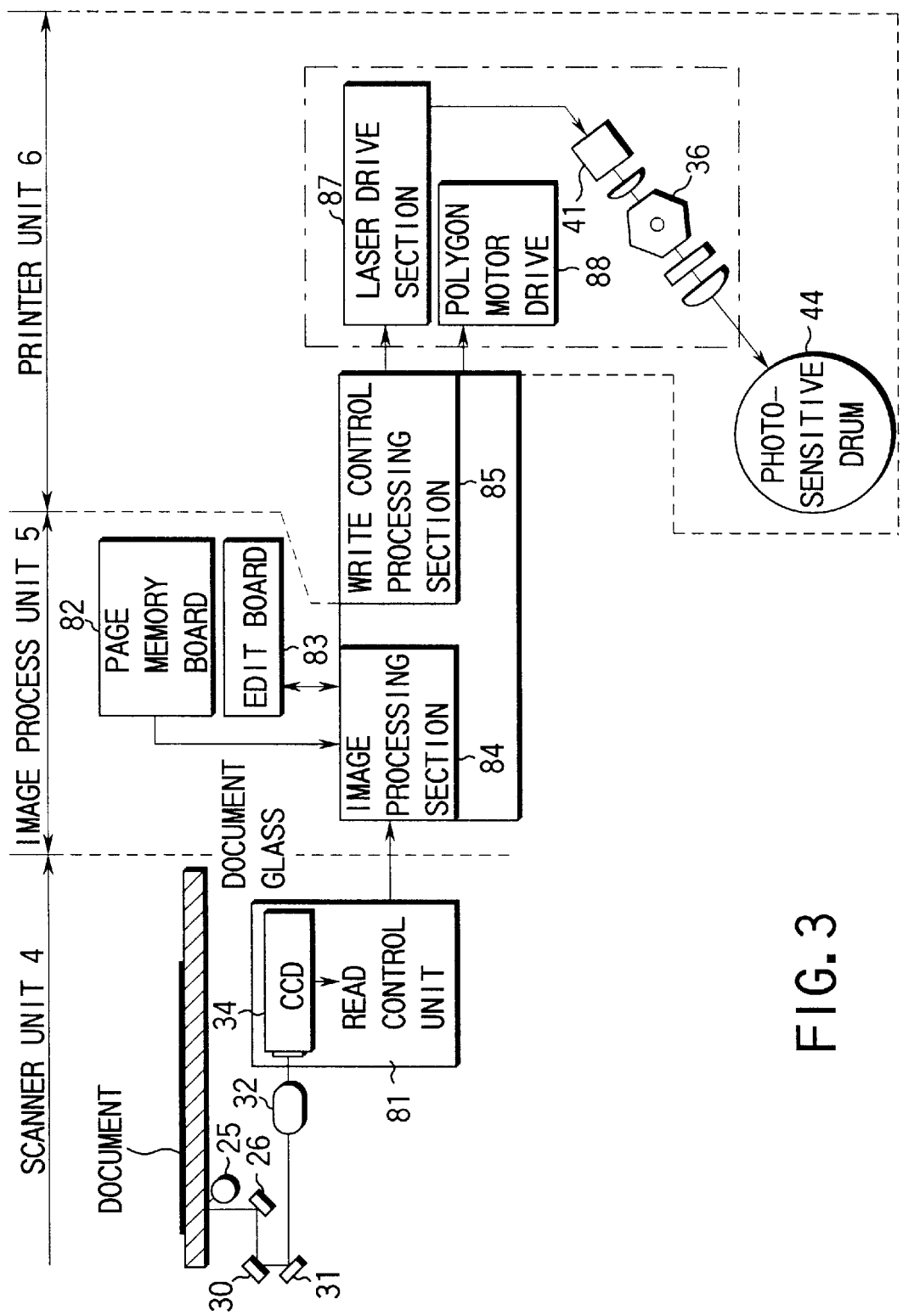
FIG. 3 shows a schematic structure of the digital copying machine shown in FIG. 1.

FIG. 3 shows a schematic structure of the digital copying machine shown in FIGS. 1 and 2. Specifically, the digital copying machine comprises the scanner unit 4, image processing unit 5 and printer unit 6, as described above. When a document image is read in the digital copying machine, as shown in FIG. 3, light is directly radiated from the exposure lamp 25 onto the surface of the document. Reflection light is guided to the four-channel output CCD 34 with use of the mirrors 26, 30 and 31 and focusing lens 32. The four-channel output CCD 34 photoelectrically converts the optical image data to electric charge signals associated with a plurality (e.g. 7500 in the case of 600 dpi) of light-receiving elements. The charge signals are successively transferred and output as analog signals from CCD analog shift registers (described later) in the four-channel output CCD 34.

As is shown in FIG. 3, the control system shown in FIG. 2 comprises a read control unit 81 including the four-channel output CCD 34, a page memory board 82, an edit board 83, an image processing unit 84, a write control processing unit 85, a laser drive unit 87, and a polygon motor drive 88. A laser beam from the semiconductor laser 41 is deflected by the polygon mirror 36 and guided to the photosensitive drum 44.

Figure 4:
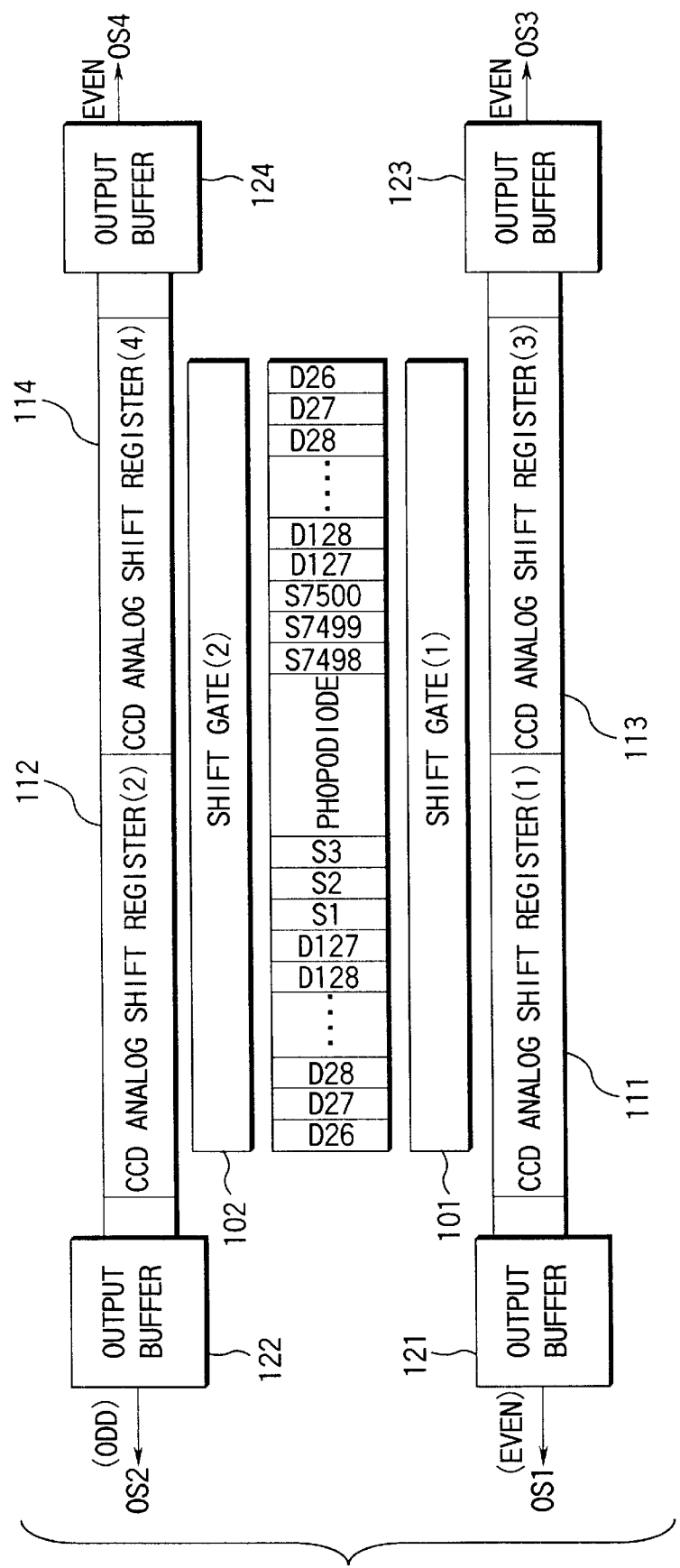
FIG. 4 shows a structure of a four-channel output CCD.

FIG. 4 shows a detailed structure of the four-channel output CCD 34. The four-channel output CCD 34 comprises sequentially arranged light-receiving elements (e.g. photodiodes) S1 to S7500, a shift gate 101, a shift gate 102, CCD analog shift registers 111 to 114 and output buffers 121 to 124.

The four-channel output CCD 34, as shown in FIG. 4, has such a four-channel output structure that a signal output is divided into even components and odd components and the even components and odd components are further divided into left components and right components. Accordingly, the four CCD analog shift registers 111, 112, 113 and 114 are provided. The CCD analog shift register 111 successively transfers and outputs odd signal components from the left-end light-receiving element. The analog shift register 112 successively transfers and outputs even signal components from the left-end light-receiving element. The analog shift register 113 successively transfers and outputs odd signal components from the right-end light-receiving element. The analog shift register 114 successively transfers and outputs even signal components from the right-end light-receiving element.

The last odd and even signal components output from the right and left are those output from the light-receiving elements S3749, S3750, S3751 and S3752 which are adjacent to each other in the middle of the light-receiving elements S1 to S7500. Control signals (transfer clock, shift gate signal, reset signal, clamp signal) necessary for driving the four-channel output CCD 34 are generated by a CCD drive function of a high-speed scanner control ASIC as will be described later.

Figure 5:
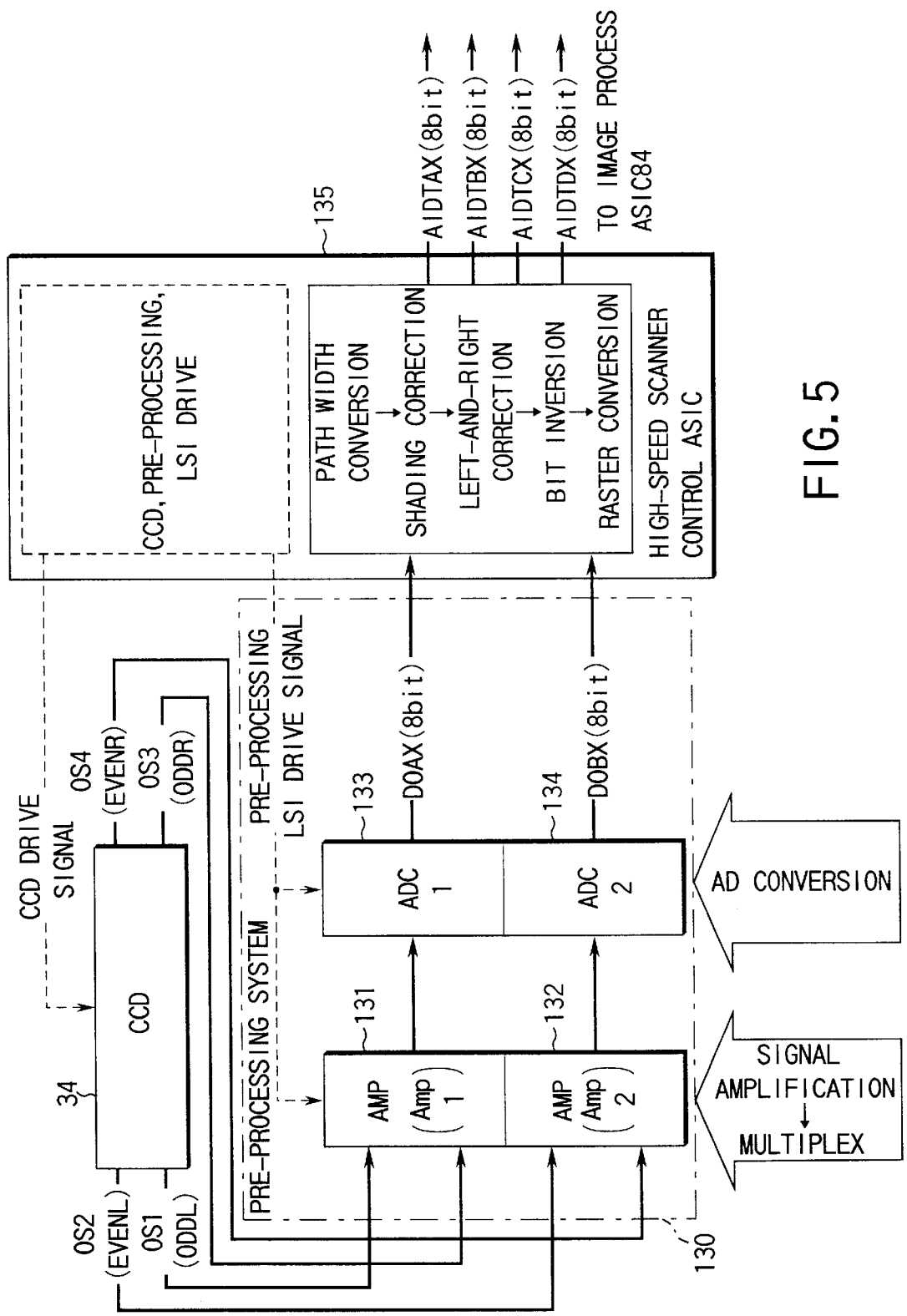
FIG. 5 shows a structure of a pre-processing system and a high-speed scanner control ASIC.

FIG. 5 shows structures of a pre-processing system 130 and a high-speed scanner control ASIC 135 for transferring image data in the four-channel output CCD 34 provided in the read control unit 81. The preprocessing system 130 comprises amplifiers 131 and 132 and A/D converters 133 and 134.

In the pre-processing system 130, analog signals output from the four-channel output CCD 34 are sampled and amplified in units of a pixel signal in the amplifiers (Amp: analog signal processing integrated circuits) 131 and 132.

The amplifier 131, 132 used here has a one-chip structure and can process two-channel signals in parallel. The amplifier 131 receives odd pixel signal components of two left and right channels (output terminals OS1, OS3) from the four-channel output CCD 34. The amplifier 132 receives even pixel signal components of two left and right channels (output terminals OS2, OS4) from the four-channel output CCD 34.

In each amplifier 131, 132, pixel signals of two left and right channels from the four-channel output CCD 34 are processed (sampled and amplified) in parallel and then multiplexed into one channel. Specifically, the amplifier 131 multiplexes the left and right odd signal components into one channel, the amplifier 132 multiplexes the left and right even signal components into one channel, and the respective one-channel signals are output from the amplifiers 131 and 132.

The amplifier 131 processes, in a batch, the left and right odd pixel signal components from the four-channel output CCD 34. The amplifier 132 processes, in a batch, the left and right even pixel signal components from the four-channel output CCD 34. With this structure, distortions of left and right signals of the even and odd components of the output signal from the four-channel output CCD 34 are prevented from depending on a variance (a variance in circuit characteristics due to a difference in chips) between chips of amplifiers (131, 132).

In this case, the rate of signal output from the amplifier 131, 132 is double the rate of signal input to the amplifier 131, 132. The pixel-unit analog signal output from the amplifier 131, 132 and amplified up to a proper level for signal processing is A/D converted by the AD converter (ADC 133, 134) to a digital signal.

The amplifier 131 samples in parallel and amplifies the left and right two-channel pixel signals of the odd components output from the four-channel output CCD 34 and multiplexes these signals into a one-channel signal. The analog signal output from the amplifier 131 is A/D converted by the A/D converter 133. The amplifier 132 samples in parallel and amplifies the left and right two-channel pixel signals of the even components output from the four-channel output CCD 34 and multiplexes these signals into a one-channel signal. The analog signal output from the amplifier 132 is A/D converted by the A/D converter 134. Since the resolution of the A/D converter 133, 134 used here is 8 bits (bit: 256 steps), the pixel data is 8-bit data per pixel.

Pre-processing in the scanner unit 4 refers to a series of processes wherein the pixel signals. (analog signals) output from the four-channel output CCD 34 on the basis of the image information read by the four-channel output CCD 34 (image information input to the four-channel output CCD 34 as optical image data) are amplified and multiplexed by the amplifiers 1:31, 132 and the resultant signals are A/D converted to digital signals by the A/D converters 133, 134. These elements constitute the pre-processing system 130.

Control signals necessary for driving the amplifiers 131 and 132 (sample/hold pulses, multi-plexing signals, clamp signals) and an A/D conversion clock necessary for AD conversion in the A/D converter 133, 134 are generated by a pre-processing LSI drive function of the high-speed scanner control ASIC 135. The pixel signals (8-bit data per pixel; hereinafter "image data") based on the pre-processed image information are input to the high-speed scanner control ASIC 135, and subjected to a shading correction process, a left-and-right correction process which characterizes the present invention, and a raster conversion process in the high-speed scanner control ASIC 135.

Figure 6:
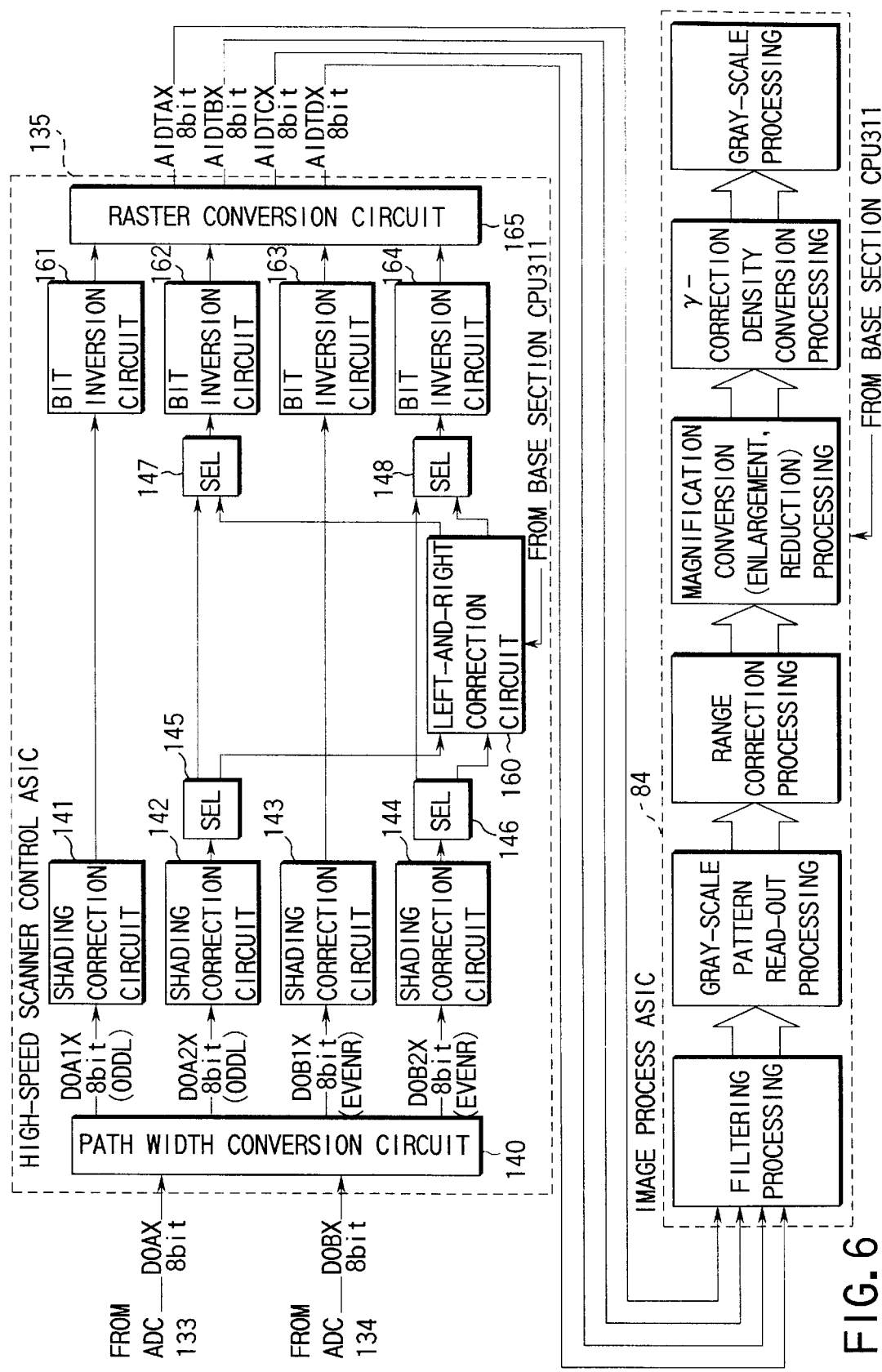
FIG. 6 is a block diagram showing a structure of the high-speed scanner control ASIC.

FIG. 6 shows a structure of the high-speed scanner control ASIC 135 according to the present invention. Specifically, the high-speed scanner control ASIC 135 comprises a bus width conversion circuit 140, shading correction circuits 141, 142, 143 and 144, bus select circuits (SEL) 145, 146, 147 and 148, a left-and-right correction circuit 160, bit inversion circuits 161, 162, 163 and 164, and a raster conversion circuit 165.

The image data pre-processed by the pre-processing system 130 is input to the high-speed scanner control ASIC 135 in two channels as DOAX (8-bit: left and-right multiplexed data of odd components) and DOBx (8-bit: left-and-right multiplexed data of even components).

All processing in the high-speed scanner control ASIC 135 is performed for the image data digitized in the pre-processing system 130. The image data is passed through the bus width conversion circuit 140 and divided into left data and right data of odd components and left and right data of even components. Specifically, the left-and-right multiplexed data DOAx (8-bit) of odd components is divided into DOA1X (8-bit: left data of odd component) and DOA2X (8-bit: right data of odd component) by the bus width conversion circuit 140. The left-and-right multiplexed data DOBx (8-bit) of even components is divided into DOB1X (8-bit: left data of even component) and DOB2X (8-bit: right data of even component) by the bus width conversion circuit 140.

Accordingly, the input two-channel image data is divided into four channels by the bus width conversion circuit 140. Thus, for example, where the two-channel image data is input as DOAX and DOBX with a data rate of 40 MHz per channel, the output image data after bus width conversion processing is output to the next state in four channels as DOA1X, DOA2X, DOB1X and DOB2X with a data rate of 20 MHz per channel.

The image data DOA1X (8-bit: left data of odd component), DOA2X (8-bit: right data of odd component), DOB1X (8-bit: left data of even component) and DOB2X (8-bit: right data of even component) is subjected to a shading correction process in the shading correction circuits 141, 142, 143 and 144. In the case of the high-speed scanner control ASIC shown in the figure, since there are provided four shading correction circuits, the four-channel image data DOA1X, DOA2X, DOB1X and DOB2X subjected to the bus width conversion processing can be simultaneously processed in parallel.

The shading correction function will now be described in brief.

Shading correction is classified into white-level shading correction and black-level shading correction. The high-speed scanner control ASIC 135 has a circuit configuration based on algorithms which can perform both corrections.

In the white-level shading correction, the data (image data) on the document read by the four-channel output CCD 34 is divided in units of a pixel by while reference data read by the four-channel output CCD 34 in advance. Thereby, the read data (image data) on the document is normalized (corrected) in units of a pixel. Thus, a variance in illuminance and a variance in sensitivity of each light-receiving element of four-channel output CCD 34 can be corrected.

In the black-level shading correction, for instance, influence of dark current occurring in the light-receiving element in the four-channel output CCD 34, which is a main factor of distortion of black level, is cancelled (corrected) by subtracting, in units of a pixel, black-reference data read in advance by the four-channel output CCD 34 from the read data (image data) on the document read by the four-channel output CCD 34 and white-reference data.

The shading-corrected image data is corrected by the left-and-right correction circuit 160 characterizing the present invention, with respect to left and right data of even and odd components. The corrected data is then bit-inverted by the bit inversion circuits 161, 162, 163 and 164. The resultant image data is rearranged in order by the raster conversion circuit 165.

The image data subjected to the series of processes in the high-speed scanner control ASIC 135 is output from the high-speed scanner control ASIC 135 as AIDTAX (8-bit), AIDTBX (8-bit), AIDTCX (8-bit) and AIDTDX (8-bit) and delivered to the image processing ASIC 84. The image data input to the image processing ASIC 84 is subjected to a series of data processes by image processing such as filtering processing, gray-scale pattern read processing, range correction processing, magnification conversion (enlargement, reduction) processing, γ-correction density conversion processing and gray-scale processing.

Figure 7:
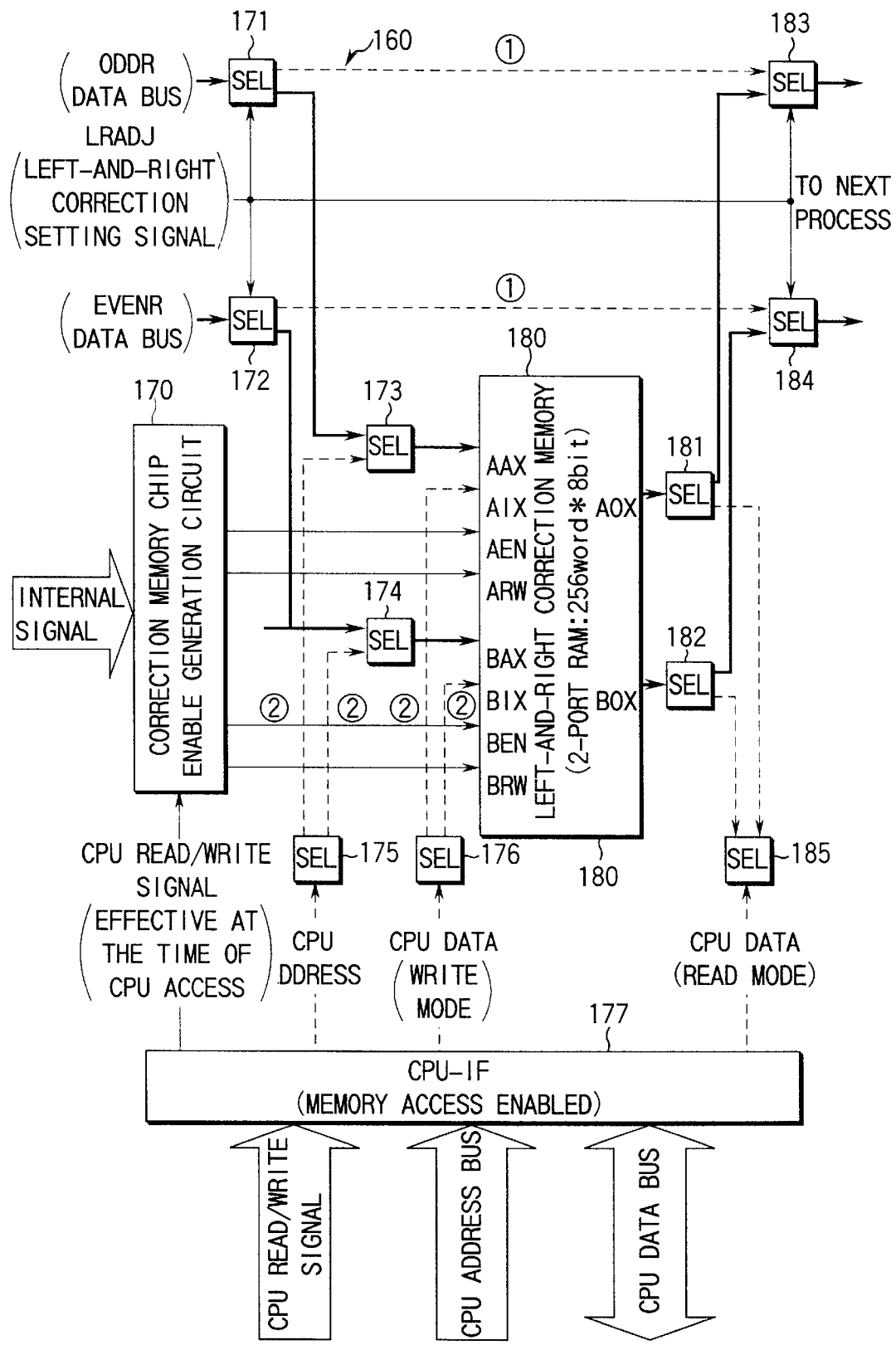
FIG. 7 shows a structure of a left-and-right correction circuit.

FIG. 7 shows a structure of the left-and-right correction circuit 160. The left-and-right correction circuit 160 comprises a correction memory chip enable generation circuit 170, bus select circuits (SEL) 171, 172, 173, 174, 175 and 176, a left-and-right correction memory 180, and bus select circuits (SEL) 181, 182, 183, 184 and 185. The left-and-right correction circuit 160 is controlled via a CPU-IF circuit 177.

As has been described above, in order to meet a demand for high-speed operational specifications, the high-speed line sensor (four-channel output CCD 34) used as a read scanner of a high-speed digital copying machine employs four CCD analog shift registers 111 (for transferring charge signals of left odd, components), 112 (for transferring charge signals of left even components), 113 (for transferring-charge signals of right odd components) and 114 (for transferring charge signals of right even components) as shown in FIG. 4, thereby to divide one-line charge signals (e.g. 7500 pixel signals in a case of 600 dpi), which have been photoelectrically converted by the light-receiving elements S1 to S7500 of the four-channel output CCD 34, into four channels through the left and right four output buffers 121 (for driving the signal output of left odd components), 122 (for driving the signal output of left even components), 123 (for driving the signal output of right odd components) and 124 (for driving signal output of right even components), and to output the resultant signals and to output them.

With the above structure, the last pixel signals of the odd and even components output from the left and right are the signals from the light-receiving elements S3749, S3750, S3751 and S3752 arranged adjacent to each other at the center of the four-channel output CCD 34. Accordingly, in the case of the four-channel output CCD 34, the signal output constitution is such that the even and odd components of one-line pixel signals of the four-channel output CCD 34 are driven and output by the respective left and right output buffers (121 and 123; 122 and 124). Thus, the signal transmission path at first is obviously divided into four channels at the output stage of the four-channel output CCD 34.

The pixel signals (analog signals) output from the four-channel output CCD 34 are amplified and A/D converted to digital image data through the aforementioned pre-processing system 130. In this case, too, the signal transmission path is freely varied between one and four channels by the constitution of the pre-processing system 130.

Accordingly, the image information input to the four-channel output CCD 34 as optical image signals is photo-electrically converted to charge signals by the respective light-receiving elements (S1 to S7500) in the four-channel CCD 34. At this time, even in the case where optical image signals of a document to be read, which has the same reflectance, are photoelectrically converted, as image information on the document, to charge signals by the light-receiving elements (S1 to S7500), if the transmission path (processing path) of the charge signals alters, there may occur a distortion among image signals (image data) due to a deviation in circuit characteristics of the inside of the four-channel output CCD 34 and the pre-processing system 130.

Figure 16:
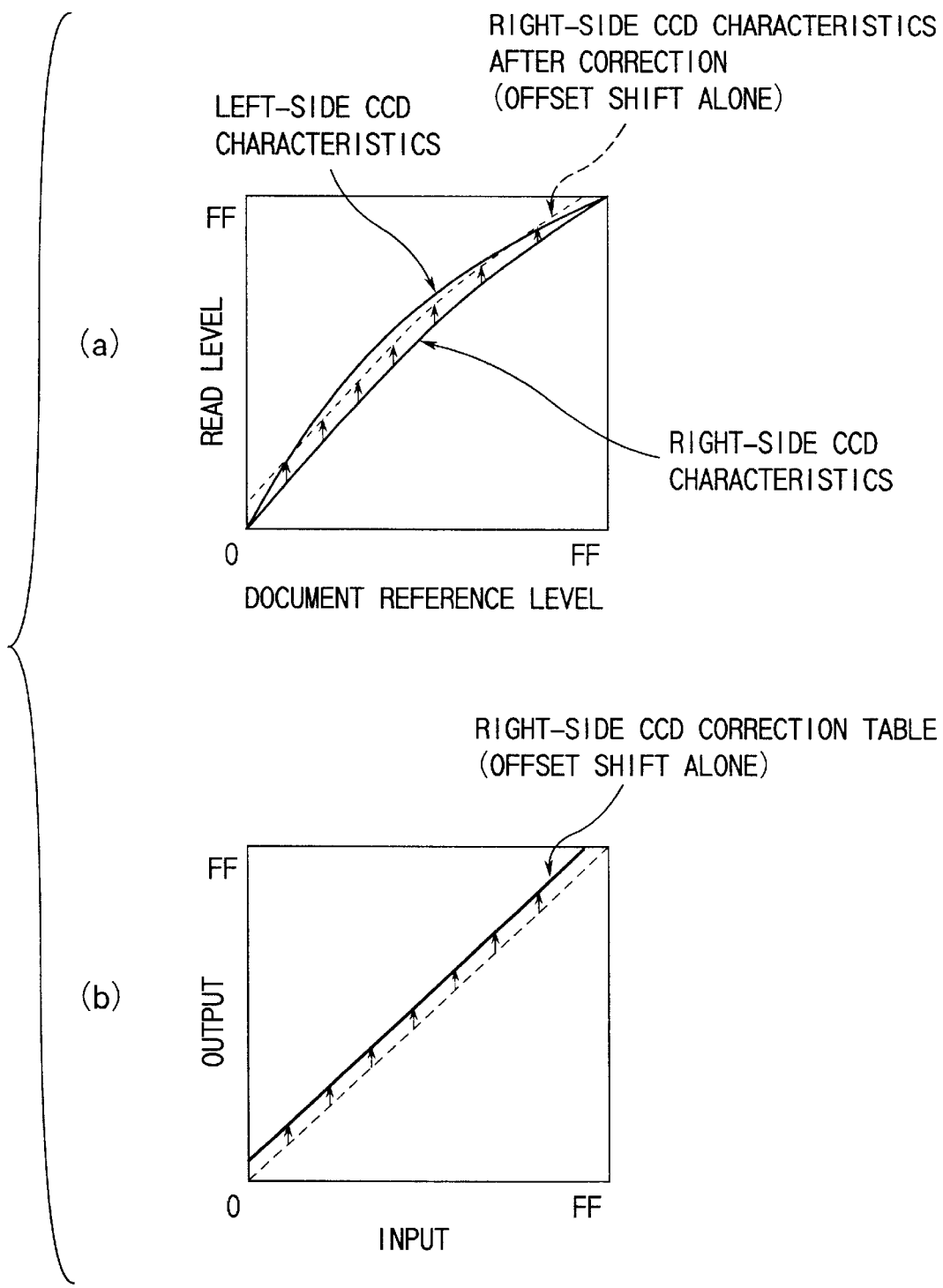
FIG. 16 shows an example of correction by a left-and-right correction circuit with offset alone.

In fact, it was confirmed by simulations that when image data is printed as a copy, the adverse affect due to such a deviation in circuit characteristics does not appear on the printed image as an average density error, in a case where the even and odd components of output signals of the CCD are processed through the same signal transmission paths (processing paths) respectively, as in the case of the pre-processing system using the conventional two-channel output CCD as shown in FIG. 16. However, if the even and odd components are further divided into left and right components and processed through the respective signal transmission paths (processing paths), as in the case of the pre-processing system 130 using the four-channel output CCD 34 for the high-speed digital copying machine as shown in FIG. 5, the adverse affect appears at a visible level on the printed image as an average density error between the left and right components.

In other words, it is not so important that the signal transmission paths (processing paths) are different for odd and even components, but the important thing is that when the four-channel output CCD 34 which can achieve high-speed operations is used, the left and right signal transmission paths (processing paths) should in principle be the same. If this construction can be adopted for the four-channel output CCD 34 and pre-processing system 130, there is no need to take special measures for the adverse affect due to the deviation in circuit characteristics.

However, the physically feasible system configuration is that of the pre-processing system 130 shown in FIG. 5. As regards the CCD, because of the construction of the four-channel output CCD 34, the charge signals are photoelectrically converted by the light-receiving elements S1 to S7500 and the resultant one-line pixel signals are divided into four channels and output from the left and right four output buffers 121, 122, 123 and 124 with use of the four CCD analog shift registers 111, 112, 113 and 114. Consequently, a deviation occurs due to the transmission efficiency of the CCD analog shift registers (111, 112, 113, 114), characteristics of the output buffers (121, 122, 123, 124), etc.

In actuality, some external correction means needs to be provided to cope with the adverse affect on the left and right image data due to the deviation in circuit characteristics occurring because of the internal construction of the CCD chip itself (a density difference between left and right components due to a linearity deviation of image data in relation to image density). This means is a left-and-right correction function, which is provided as a module function of the high-speed scanner control ASIC 135. left-and-right correction circuit 160 in the high-speed scanner control ASIC 135 is positioned after the shading correction circuits 141, 142, 143 and 144 and, in the image data processing flow, precedes the series of data processes by image processing in the image process ASIC 84 such as filtering processing, gray-scale pattern read-out processing, range correction processing, magnification conversion (enlargement, reduction) processing, γ-correction density conversion processing and gray-scale processing.

The meaning of this positioning will be described later. The construction of the left-and-right correction circuit 160 will first be described.

The left-and-right correction in the left-and-right correction circuit 160 is performed by a data conversion table method using the memory 180. Specifically, data to be converted (image data in this case) is input to addresses in the memory 180. Data (corrected data) preset to the addresses in the memory 180 is output, instead, as converted data from the data output of the memory 180, and thus the conversion process is carried out.

Accordingly, since the image data treated in the high-speed scanner control ASIC 135 is a digital signal with 8 bits per pixel and a resolution of 256 steps (00H to FFH), a 256 word *8 bit memory is provided as the memory 180 for the data conversion table for the image data.

The left-and-right correction circuit 160 comprises the memory 180, which is a 256-word *8 bit two-port RAM, the chip enable generation circuit 170, and the bus select circuits 171, 172, 173, 174, 175, 176, 181, 182, 183, 184 and 185. The left-and-right correction circuit 160 is controlled via the CPU-IF circuit 177. The mode in the memory 180 can be switched by a mode set signal (memory access mode set signal: set by DAM) between an access mode (data correction processing) by data processing in the high-speed scanner control ASIC 135 and an access mode (data set for conversion table) for access from the base section CPU (external) 311.

In addition, since left-and-right correction execution selection (left-and-right correction setting signal: set by LRADJ) can be set, the image data can be sent to the subsequent-stage process without left-and-right correction (the image data paths in this case being indicated by broken lines ①). Mode setting registers (not shown) for setting various modes are prepared in the high-speed scanner control ASIC 135. The setting in all these registers can be altered from the base section CPU (external) 311.

At first, in the case where the memory 180 is set in the access mode (data correction process being enabled) by the data processing within the high-speed scanner control ASIC 135 and correction is made by the left-and-right correction setting signal, the image data bus in the high-speed scanner control ASIC 135 is connected to the memory 180.

Specifically, the image data, which has been digitized by the pre-processing system 130 and input to the high-speed scanner control ASIC 135 in two channels, is first divided into four channels (left data of odd component, right data of odd component, left data of even component, and right data of even component). The four-channel divided image data is subjected to the shading correction process in parallel at the same time in the shading correction circuits 141, 142, 143 and 144.

Of the shading-corrected four-channel image data, one of the odd-component right and left channels, e.g. the right data bus, and one of the even-component right and left channels, e.g. the right data bus, that is, two channels, are connected to the correction memory 180 by the bus select circuits 171 to 175, 181 to 184. Specifically, the bus lines indicated by broken lines ① are disabled, and one of the odd-component right and left channels, e.g. the right data channel (image data prior to left-and-right correction), is connected to an address input AAX of ports A of memory 180. Conversion data (image data after left-and-right correction) corresponding to this data is output from a data output AOX of ports A. One of the even-component right and left channels, e.g. the right data channel (image data prior to left-and-right correction), is connected to an address input BAX of ports B of the correction memory. Conversion data (image data after left-and-right correction) corresponding to this data is output from a data output BOX of ports B.

Specifically, data operations by the memory 180 using the data conversion table can be performed for one of the even-component right and left channels and one of the odd-component right and left channels, for example, right data channels. As is understood from this, the data operations by the memory 180 using the data conversion table require two-channel inputs/outputs for the memory in order that the data operations are performed for one of the even-component right and left channels and one of the odd-component right and left channels. In addition, since the two-channel image data is to be processed (memory-accessed) in parallel by the same data conversion table, the two-port type memory satisfying these conditions is used.

One of major points of the idea of left-and-right data correction by this method is that one of the even-component right and left channels and one of the odd-component right and left channels, for example, left data channels, are considered as reference channels, and the other channels, e.g. right data channels if left data channels are reference channels, are subjected to data operations using the data conversion table by the correction memory. In other words, one of right and left channels is used for data operations, and a linearity deviation of right and left image data with respect to image density is corrected.

The meaning of the position of the left-and-right correction process will now be explained.

The image data, which has been digitized by the pre-processing system 130 and is to be subjected to internal processing in the high-speed scanner control ASIC 135, is such image data that includes, for each pixel, a density gradient deviation, i.e. illuminance variance, occurring in each pixel of image data with respect to image density, a sensitivity variance among light-receiving elements in the four-channel output CCD 34, and an influence of dark current occurring in light-receiving elements S1 to S7500 and CCD analog shift registers 111 to 114 in four-channel output CCD 34. In addition, this image data includes an influence of a linearity deviation among left and right image data with respect to image density, which is a deviation inherent in the structures of the four-channel output CCD 34 for achieving high-speed operations and the pre-processing system 130, that is, a deviation in circuit characteristics due to a difference in right and left signal transmission paths (processing paths) in the four-channel output CCD 34 and pre-processing system 130.

The influences of the two deviations act on the image data in a different manner. Specifically, the influence of the density gradient deviation occurring in respective pixels of image data with respect to image density acts on each pixel of image data. On the other hand, the influence of the linearity deviation occurring between left and right image data (between signal transmission paths (processing paths)) with respect to image density acts on each signal transmission path (each processing path).

More specifically, when there are two signal transmission paths (processing paths) A and B (left and right in this case) and a deviation in circuit characteristics has occurred between these signal transmission paths (between processing paths), if the signal transmission path (processing path) A, for example, is regarded as a reference path, it is considered that the deviation in circuit characteristics acts on the other signal transmission path (processing path) B. In this case, it is considered that the influence of the deviation acts on all pixel signals transmitted (processed) in the signal transmission path (processing path) B uniformly at a fixed degree.

It is therefore considered that the influences of the two different deviations included in the image data digitized by the pre-processing system 130 (the influence of the density gradient deviation occurring in respective pixels of image data with respect to image density and the influence of the linearity deviation occurring between left and right image data (between signal transmission paths (processing paths)) with respect to image density) should be corrected by different correction means.

The specific idea for this is that the influence of the density gradient deviation occurring in respective pixels of image data with respect to image density is corrected by the shading correction function, while the influence of the linearity deviation occurring between left and right image data (between signal transmission paths (processing paths)) with respect to image density is corrected by the left-and-right correction circuit 160 characterizing the present invention.

Based on this idea, the process configuration (process flow) for image data in the high-speed scanner control ASIC 135 is set, as shown in FIG. 6. At first, the shading correction circuits 141 to 144 are arranged to subject the image data to shading correction. The shading-corrected image data is subjected to left-and-right correction by the left-and-right correction circuit 160. These correction processes are carried out prior to the series of data processes by image processing in the image process ASIC 84 such as filtering processing, gray-scale pattern read-out processing, range correction processing, magnification conversion (enlargement, reduction) processing, γ-correction density conversion processing and gray-scale processing.

To start with, the variance among pixels, i.e. influence of the density gradient deviation occurring in respective pixels of image data with respect to image density, is corrected by the shading correction. The corrected (normalized) image data is further corrected by the left-and-right correction method characterizing the present invention, by commonly using one data conversion table, which changes one signal value to another (in a range of 00H to FFH since signals to be treated are 8-bit digital signals), for signal values of all pixel signals forming image data which are transmitted (processed) in the signal transmission path (processing path) requiring amendment.

Since these processes aim at correcting the influences of the two deviations occurring through the four-channel output CCD 34 and pre-processing system 130, the processes are, as a matter of course, performed prior to the series of data processes by image processing in the image process ASIC 84 such as filtering processing, gray-scale pattern read-out processing, range correction processing, magnification conversion (enlargement, reduction) processing, γ-correction density conversion processing and gray-scale processing.

A method of setting the left-and-right correction table in the memory 180 in the left-and-right correction circuit 160 will now be described.

As has been described above, the mode in the memory 180 can be switched by a mode set signal (memory access mode set signal: set by DAM) between the access mode (data correction processing) by data processing in the high-speed scanner control ASIC 135 and the access mode (data set for conversion table) for access from the base section CPU (external) 311.

Accordingly, in the case where the memory 180 is in the access mode from the base section CPU (external) 311 (in the state in which the data for the left-and-right correction table can be set by the base section CPU 311), as shown in FIG. 7, an address/data bus from the base section CPU (external) 311 is connected to the memory 180 via the CPU-IF circuit 177 in the high-speed scanner control ASIC 135. Specifically, since the lines indicated by broken lines ② are enabled, the base section CPU (external) 311 sets (writes) in the memory 180 correction data for the left-and-right correction table generated on the basis of a deviation occurring between left and right image data.

In addition, since the access from the base section CPU (external) 311 to the memory 180 permits read/write/ the data in the memory 180 may be referred to.

The raster conversion circuit 165 will now be described.

The function of the raster conversion circuit 165, too, is an inherent function required by using the high-speed line sensor, i.e. the four-channel output CCD 34, for the read scanner in the high-speed digital copying machine. The purpose of the raster conversion circuit 165 is a rearrangement by sequential operations of image data.

The reason why the rearrangement of image data is required if the four-channel output CCD 34 is fused will now be explained with reference to FIGS. 8 and 9.

Figure 8:
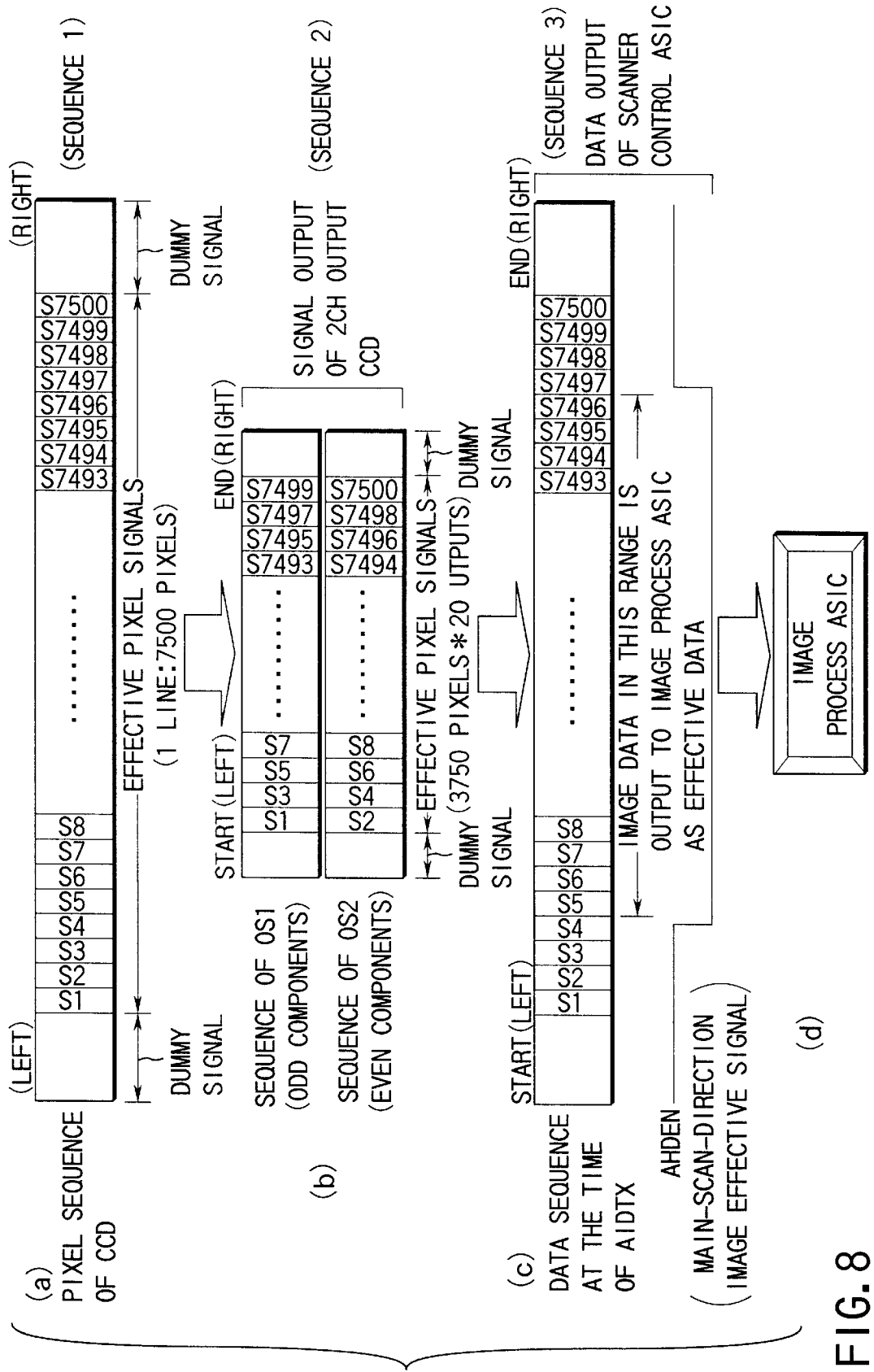
FIG. 8 shows flows of data sequences where a conventional two-channel output CCD is used.
Figure 9:
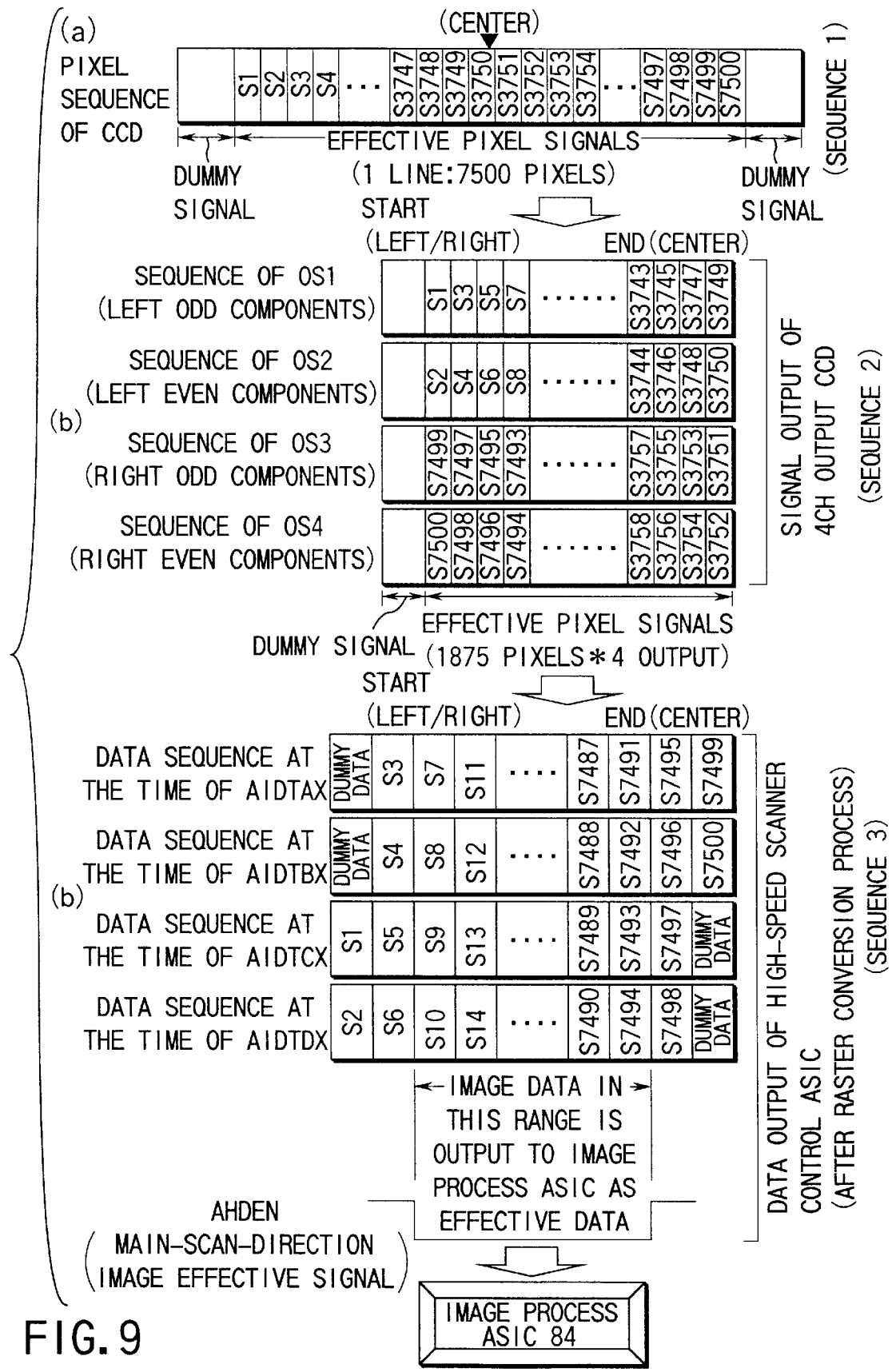
FIG. 9 shows flows of data sequences where a four-channel output CCD is used.

FIG. 8 shows a flow of data sequences in the case of using the conventional two-channel output CCD, and FIG. 9 shows a flow of data sequences in the case of using the four-channel output CCD according to the present invention. The pixel sequence of the two-channel output CCD and the pixel sequence of the four-channel output CCD comprise dummy pixels sand effective pixels, respectively, as the former ,is shown by sequence 1 in FIG. 8 and the latter is shown by sequence 1 in FIG. 9.

Image information on the document to be read is output from the CCD as effective pixel signals from effective pixels. The number of effective pixels is 7500 (S1 to S7500)

in the CCD matching with 600 dpi. The effective pixels are arranged sequentially from the left (S1) to the right (S7500), as indicated by sequence 1. The arrangement of the effective pixels is common between the conventional two-channel output CCD and the four-channel output CCD 34 of this invention. Specifically, this is the physical arrangement of the light-receiving elements (S1 to S7500).

As has been described with reference to FIG. 3, when the document image is read by the high-speed digital copying machine, light is directly radiated on the document surface and reflection light is guided to the four-channel output CCD 34 with use of the mirrors 26, 30 and 31 and focusing lens 32. The four-channel output CCD 34 photoelectrically converts the optical image data, i.e. image information, to charge signals through the respective light-receiving elements, i.e. effective pixels. The charge signals are output as effective pixel signals from the four-channel output CCD 34. The reading optical system is constructed such that the left and right of the document correspond to the left and right of the four-channel output CCD 34, that is, the left and right of the document in the direction of reading by the CCD, i.e. in the main scan direction, correspond to the left and right of the effective pixels of four-channel output CCD 34 according to sequence 1.

Accordingly, the basic concept of algorithms of the series of data processes by image processing in the image process ASIC 84, such as filtering processing, gray-scale pattern read-out processing, range correction processing, magnification conversion (enlargement, reduction) processing, γ-correction density conversion processing and gray-scale processing, is based on the fact that the data sequence of image data input to the image process ASIC 84 (a unit data sequence of one-line pixels in the main scan direction), i.e. image data as image information in every line in the main scan direction, is equal or equivalent to the well-ordered pixel sequence of the four-channel output CCD 34, i.e. sequence 1.

Specifically, the algorithms of the data operations in the series of data processes in the image process ASIC 84 are established for image data input in the well-ordered data sequence equal or equivalent to sequence 1.

In the conventional system, that is, in the system using the two-channel output CCD, as shown in FIG. 8, the pixel sequence of the CCD is equal to the image data sequence output from the scanner control ASIC to the image process ASIC. In other words, sequences 1 and 3 are equal.

More specifically, in the system using the conventional two-channel output CCD, a signal to be output from the CCD is, to begin with, divided into two channels corresponding to even components and odd components of the pixel sequence of the CCD, i.e. sequence 1. Thus, as indicated by sequence 2, effective pixel signals of odd pixels are output from an output terminal OS1 in an order beginning with the left effective pixel S1 and continuing like S3, S5, S7495, S7497, S7499 (the right-end effective pixel). On the other hand, effective pixel signals of even pixels are output from an output terminal OS2 in an order beginning with the left effective pixel S2 and continuing like S4, S6, ..., S7496, S7498, S7500 (the right-end effective pixel). With these sequences, the pixel signals are input to the scanner control ASIC in two channels.

The input two-channel image data is multiplexed to one channel in the scanner control ASIC. The image data thus has a sequence 3. In this state, the image data with the data sequence indicated by sequence 3 is subjected to the processing in the scanner control ASIC, that is, subjected to shading correction and bit inversion, and the resultant data is delivered to the image process ASIC as data AIDTX. Accordingly, a process for rearrangement by data operations is not needed with respect to sequences 1 through 3.

On the other hand, in the high-speed system using the four-channel output CCD of the present invention as shown in FIG. 9, a signal to be output from the four-channel output CCD 34 is divided into signals corresponding to even components and odd components of the pixel sequence of four-channel output CCD 34, i.e. sequence 1, like the two-channel output CCD. However, these signals are further divided into left and right components from the center of the four-channel output CCD 34, as indicated by sequence 2. Effective pixel signals of odd pixels are output from an output terminal OS1 in an order beginning with the left effective pixel S1 and continuing like S3, S5, ..., S3745, S3747, S3749 (the central effective pixel).

Similarly, effective pixel signals of even pixels are output from an output terminal OS2 in an order beginning with the left effective pixel S2 and continuing like S4, S6, ..., S3746, S3748, S3750 (the central effective pixel).

Similarly, effective pixel signals of odd pixels are output from an output terminal OS3 in an order beginning with the right effective pixel S7499 and continuing like S7497, S7495, ..., S3755, S3753, S3751 (the central effective pixel).

Similarly, effective pixel signals of even pixels are output from an output terminal OS4 in an order beginning with the right effective pixel S7500 and continuing like S7498, S7496, ..., S3756, S3754, S3752 (the central effective pixel).

As regards these four-channel signals, the amplifier 131 in the pre-processing system 130 multiplexes the left and right signals of the odd components, i.e. output terminals OS1 and OS3, into one channel, and also the amplifier 132 multiplexes the left and right signals of the even components, i.e. output terminals OS2 and OS4, into one channel. In this state, the even component and odd component are input to the high-speed scanner ASIC 135 in the two channels.

The sequences of the input two-channel image data are divided into four channels, as in the previous sequence 2, by the bus width conversion circuit 140 in the high-speed scanner ASIC 135, as shown in FIG. 6.

In this state, the four-channel image data is subjected to the processing in the high-speed scanner ASIC 135. That is, the four-channel image data with data sequence 2 is subjected to the shading correction processing by the shading correction circuits 141 to 144, the left-and-right correction processing by the left-and-right correction circuit 160 and the bit inversion by the bit inversion circuits 161 to 164. The sequences of the bit-inverted four-channel image data are rearranged by the image data sequence operations by the raster conversion circuit 165. Thus, the image data is made to have sequence 3, that is, sequence 2 is changed to sequence 3. Four-channel image data, AIDTAX, AIDTBX, AIDTCX and AIDTDX, is delivered to the image process ASIC 84.

The above is the reason why the image data delivered to the image process ASIC 84 has a four-channel configuration, compared to the conventional one-channel configuration. In the case of the high-speed digital copying machine, as a matter of course, there is a demand for a higher image processing speed. Accordingly, when one-line image data from the four-channel output CCD 34 is processed in one channel, a data transfer rate, i.e. a processing speed, for each pixel becomes very high. Consequently, various margins for hardware processing become deficient.

In order to solve this problem, the one-line image data is divided into four-channel data, and the four-channel data is processed in parallel at the same time. By the parallel processing with four channels, the data transfer rate, i.e. processing speed, per pixel is set at ¼. For example, in the case of 80 M processing with one channel, the amount of handled information is equal to the four-channel parallel processing of 20 M processing per channel.

Accordingly, in the case of the high-speed system using the four-channel output CCD 34, the data, output configuration with sequence 3 has four channels and, unlike the system using the conventional two-channel output CCD, the data sequences 1 and 3 cannot completely be made equal.

The reason why the image data subjected to the internal processing with sequence 2 is not directly delivered to the image process ASIC 84 but is delivered after being converted to sequence 3 through the raster conversion circuit 165 characterizing the present invention is based on the condition that the algorithms of the data operations in the series of data processes in the image process ASIC 84 are established for image data input in the well-ordered data sequence equal or equivalent to sequence 1.

In other words, the sequence 2 is not proper for the series of data processes in the image process ASIC 84. Sequence 3 is defined as a well-ordered data sequence equivalent to sequence 1. Accordingly, in the case of the high-speed system using the four-channel output CCD, the rearrangement of sequence 2 to sequence 3 relative to sequence 1 is defined as a rearrangement process by data operations in the raster conversion circuit 165 and is predetermined for interface between the high-speed scanner control ASIC 135 and image process ASIC 84.

The sequence of the one-line pixel image data is thus manipulated by causing the raster conversion circuit 165 to perform the (data write process→ data read process) to a purpose-specific line memory (not shown). Accordingly, the (sequence 2) shown in FIG. 9 is rearranged to the (sequence 3).

If two purpose-specific line memories (not shown) are prepared, the above processes can be performed alternately between the line memories and the image data can be successively processed in units of a line.

In this manner, the image signals output from the four-channel output CCD 34 are converted to a proper data sequence for the series of data processes by image processing. Specifically, the well-ordered image data is delivered from the high-speed scanner control ASIC 135 to the image process ASIC 84.

A method of correction in the left-and-right correction circuit 160 of the present invention will now be described with reference to FIG. 6.

In this case, processing is performed by converting the transfer of four-pixel unit data from the high-speed scanner control ASIC 135 to the transfer of one-pixel unit data in the next-stage image processing ASIC 84. The left-and-right correction circuit 160 is provided to correct a variance between left-and-right CCD characteristics of the scanner section 4 after the four-channel (left, right, odd/even) shading correction process in the high-speed scanner control ASIC 135.

The left-and-right correction circuit 160 has a table structure capable of converting 256 data to alter the input/output characteristics. Instead of the correction table structure, the left-and-right correction circuit 160 may comprise adders and subtractors capable of offsetting. These table and offset structures can be set by access from the base section CPU connected over the base section system bus 312.

The image process ASIC 84 located in rear of the high-speed scanner control ASIC 135 performs, in the named order, the filtering process, gray-scale pattern read-out process, range correction process, magnification conversion process, γ-correction density conversion process and gray-scale process.

The filtering process comprises a process by a low-pass filter (LPF) for suppressing a moiré, etc. and a process by a high-pass filter (HPF) for emphasizing an edge of a character, etc.

The gray-scale pattern read-out process is a block used to read a test pattern from the printer unit 6 and to perform the correction of a variance in the entire system and the correction of left-and-right characteristics described here. This block comprises a circuit section for reading and averaging image data of each gray scale based on the document having gray-scale data varying in the sub-scan direction, and an each-gray-scale data register for storing a read-out average value for each gray scale.

The range correction process increases the range width of image data in density reproduction to an optical level for the document.

The magnification conversion process performs enlargement/reduction processing for image data in the main scan direction, thereby to alter the document size and output size.

The γ-correction density conversion process corrects a variance in reproduction characteristics of the printer unit 6 and corrects image reproduction in each image-quality mode. The γ-correction density conversion process has a conversion table construction, and is connected to the base section system bus 312 so that the setting in the γ-correction density conversion process can be altered by access from the base section CPU 311.

The gray-scale process realizes a quasi-middle gray-scale level in conformity to a gray-scale level capable of density reproduction in the printer unit 6. The gray-scale process normally uses an error diffusion process for making character reproduction and middle gray-scale reproduction compatible or a dither process for stable middle gray-scale reproduction.

Since the gray-scale pattern read-out process is positioned after the filtering process, the read-out can be performed after cutting off a noise frequency component mixed in the data from the previous stage.

The gray-scale pattern read-out process will now be described in detail.

Figure 10:
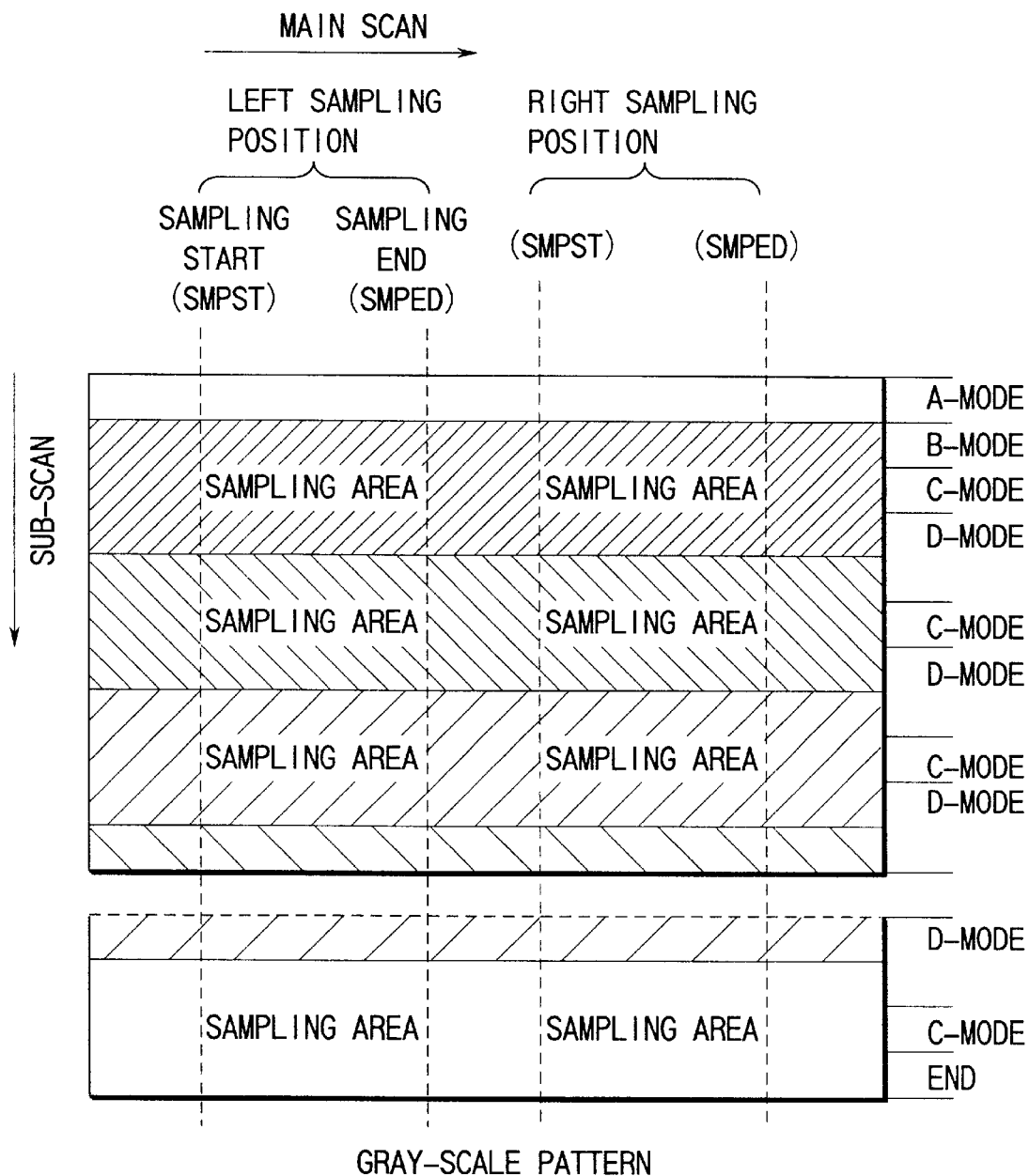
FIG. 10 shows image data of a gray-scale pattern document.

A block of image data on a gray-scale pattern document shown in FIG. 10 generally comprises a gray-scale pattern lead section (A-mode), a gray-scale data skip 1 section (B-mode), a gray-scale data calculation section (C-mode), and a gray-scale data skip 2 section (D-mode). A sampling area from a sampling start (SMPST) to a sampling end (SMPED) is set in the register.

A read-out operation of each block in the above structure will now be described with reference to flow charts of FIGS. 11 to 14.

Figure 11:
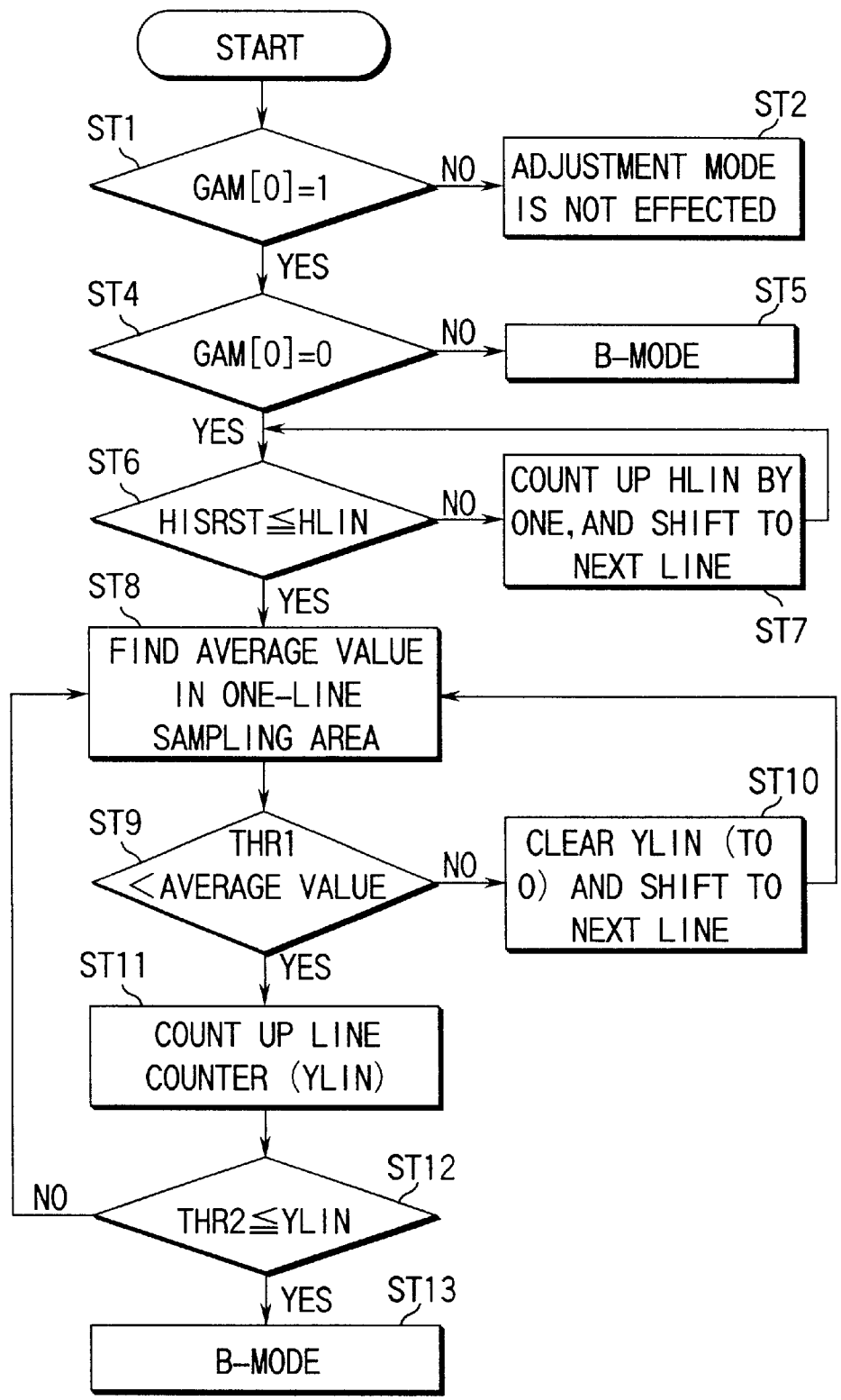
FIG. 11 is a flow chart for illustrating a read-out operation for each block.

An operation for detecting a leading position of the gray-scale pattern of the gray-scale pattern lead section (A-mode) will now be described with reference to the flow chart of FIG. 11.

A sampling area in the main scan direction is set in the register (SMPST, SMPED) by access from;the base section CPU 311. The number of sampling pixels in the main scan direction, in this case, is set to a power of 2 in order to reduce circuit configuration. Subsequently, based on the setting of the register by the base section CPU 311, it is checked whether the operation of the gray-scale pattern read-out process is effective (ST1: GAM[0]=1) and whether a gray-scale pattern leading-end setting operation switching (GAM [1]) is "0" (ST4).

If the operation of the gray-scale pattern read-out process is not effective in step ST1, the adjustment mode is not effected. If the gray-scale pattern leading-end setting operation switching (GAM[1]) is not "0", control goes to the B-mode (ST5).

Then, a leading-end setting ineffective line number HISRST in the sub-scan direction is compared to a sub-scan line counter HLIN, and skipping is made to the ineffective line (ST6, ST7). Thereafter, pixel data on the main-scan sampling area of each line is added, and an average value is found by bit shift (ST8). This average value is compared to a gray-scale pattern leading-end setting data threshold THRI (ST9). If the average value is smaller, the line counter (YLIN) is cleared (reset to 0) and the next line is checked (ST10). If the average value is greater, the line counter (YLIN) is counted up (ST11).

Subsequently, in order to determine continuity of the leading portion, a continuous line number (YLIN) is compared to a continuous line number threshold THR2 (ST12). If a continues density portion is greater than THR2, the gray-scale leading-end setting is finished and control goes to the B-mode (ST13).

Figure 12:
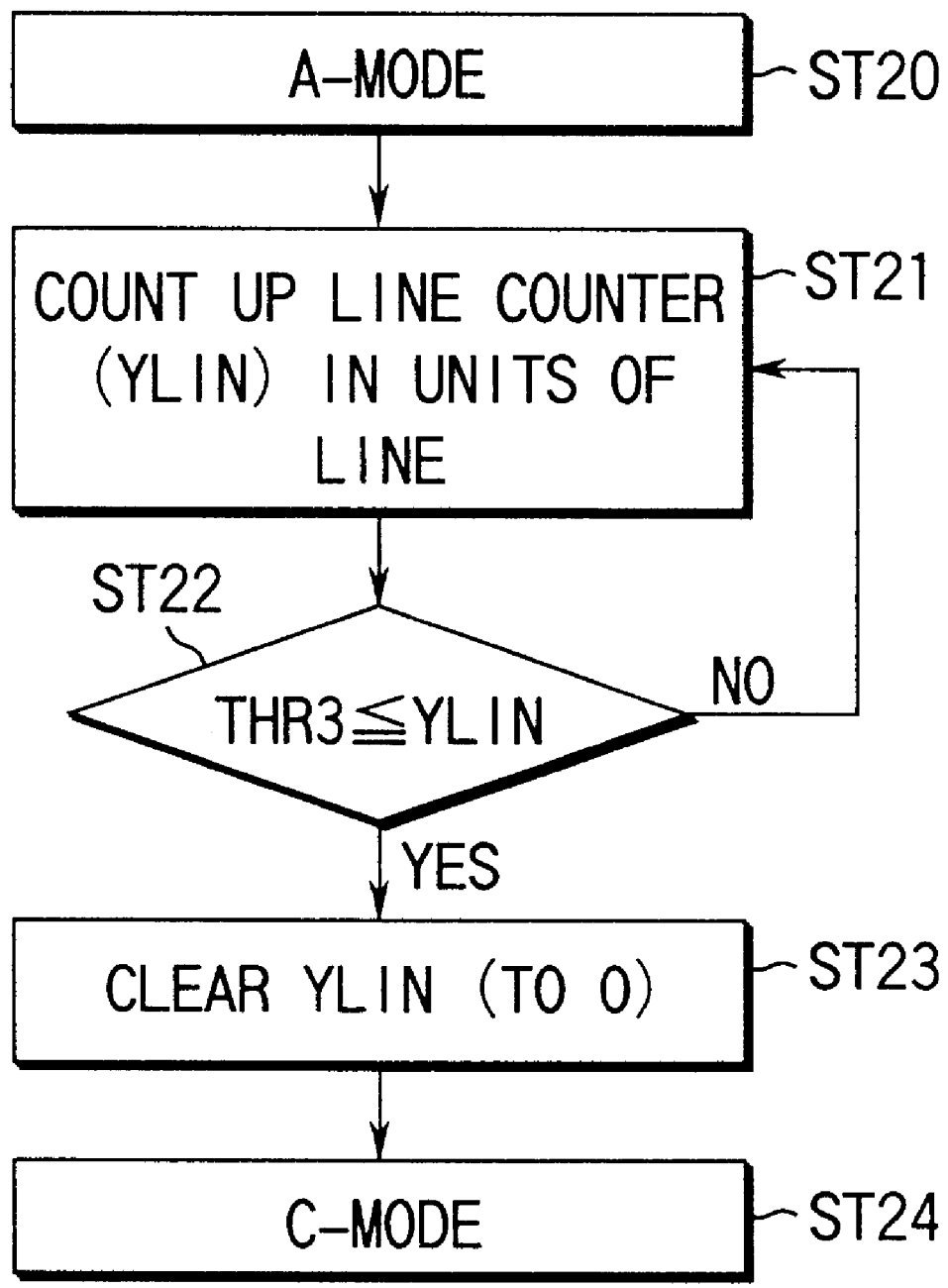
FIG. 12 is a flow chart for illustrating a read-out operation for each block.

The operation for the gray-scale data skip 1 section (B-mode) will now be described with reference to the flow chart of FIG. 12. This mode relates to the process for skipping a number of sub-scan lines up to the subsequent gray-scale data calculation section (C-mode).

With the shift from the above-described A-mode (ST20), the line counter (YLIN) is counted up in units of a line (ST21). The line number (YLIN) at which the leading-end setting has finished is compared to a gray-scale pattern skip line threshold (THR3) 1 (ST22). If the line number has become greater than the gray-scale pattern skip line threshold (THR3) 1, the line counter (YLIN) is cleared (reset to 0) (ST23) and control shifts to the C-mode (ST24).

Figure 13:
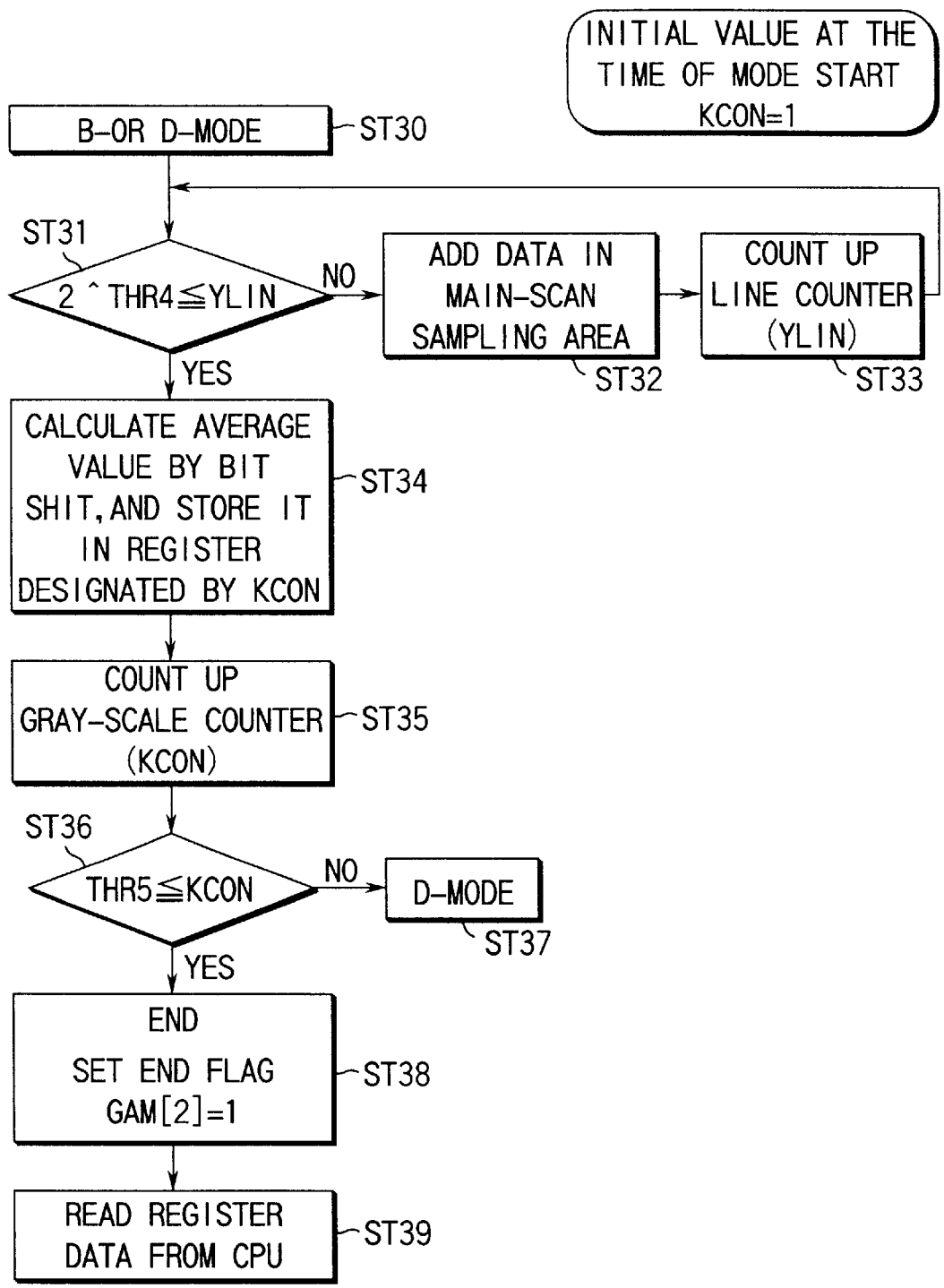
FIG. 13 is a flow chart for illustrating a read-out operation for each block.

The operation for the gray-scale data calculation section (C-mode) will now be described with reference to the flow chart of FIG. 13.

In this mode, a sampling width in the main scan direction designated by each gray-scale data and image data in the sampling area corresponding to the designated sub-scan line number are added (ST31, ST32), the line counter (YLIN) is counted up (ST33), and an average value is found by bit shift (ST34). The sampling width in the main scan direction like the case of the leading portion, is set by the register (SMPST, SMPED) by the access from the base section CPU. The line number in the sub-scan direction is set by a gray-scale data calculation line threshold (THR4) 2 (ST31).

The read-out average value for each gray scale is stored in the each-gray-scale data register (ST34). The stored data is managed by an each-gray-scale data register gray-scale counter KCON. The data stored in the register is counted up (ST35).

The value of the gray-scale counter KCON is compared to a gray-scale pattern number counter threshold THR5 for setting a variation number of the gray-scale pattern of the document (ST36). Control shifts to the next D-mode process until the value becomes equal to or more than the gray-scale pattern number counter threshold THR5 (ST37). In addition, the gray-scale data calculation section (C-mode) is repeated.

However, if the value has become equal to or more than the gray-scale pattern number counter threshold THR5 (ST36), an end flag is set (ST38) and the gray-scale pattern read-out process is finished.

In this case, the value in the each-gray-scale data register storing the read-out average value for each gray scale is read out from the base section CPU 311 and used for the calculation process (ST39).

Figure 14:
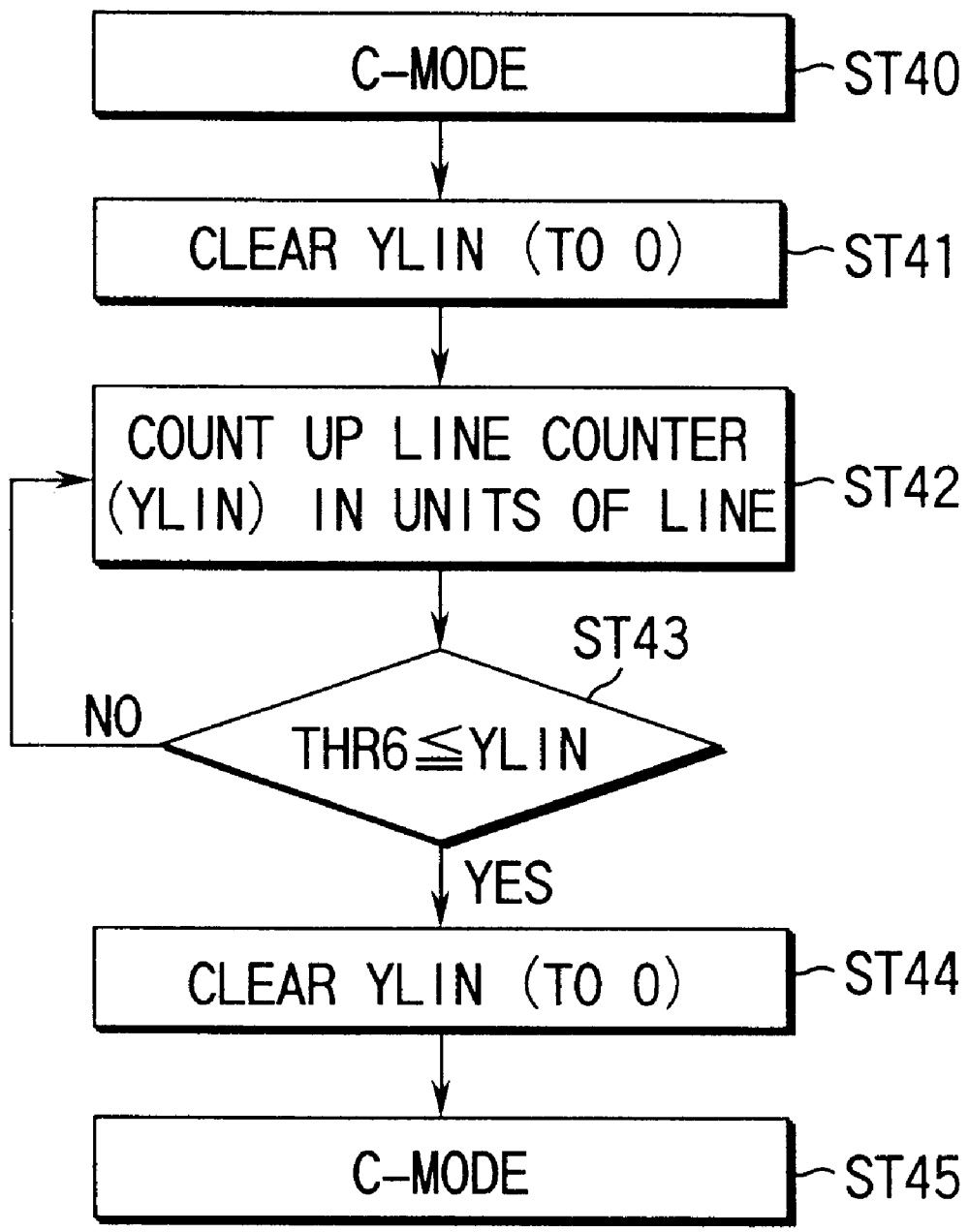
FIG. 14 is a flow chart for illustrating a read-out operation for each block.

The operation of the gray-scale data skip 2 section (D-mode) will now be described with reference to the flow chart of FIG. 14.

This mode relates to a process for skipping a number of sub-scan lines up to the start of the next gray-scale data calculation section (C-mode).

To start with, from the last line of the gray-scale data calculation section (C-mode) (ST40), the line number (YLIN) is cleared to 0 (ST41) and the line counter (YLIN) is counted up in units of a line (ST42). The line number (YLIN) is compared to a gray-scale pattern skip line threshold THR 6 (ST43). If the line number (YLIN) has become greater than the gray-scale pattern skip line threshold THR 6, the line number (YLIN) is cleared to "0" (ST44) and control shifts to the next C-mode (ST45).

The left-and-right correction circuit 160 in this case reads reference information and corrects an error in left and right CCD characteristics. In the present case, a gray-scale pattern having a density varying in the sub-scan direction is prepared as a reference document, and left-and-right variance information on the scanner unit 4 is read out by the gray-scale pattern read-out process in the image process ASIC 84. Based on the left-and-right variance information, a calculation process is executed in the base section CPU 311 and then the correction value is set on the left-and-right correction table in the memory 180. The left-and-right correction function is thus applied to the normal copying mode.

A description will now be given of an example of the gray-scale pattern read-out process operation in the image process ASIC 84.

A gray-scale pattern document prepared as a reference in advance is placed on the document table 12 (in this case, a high density portion being set on a read-out leading line side). A gray-scale pattern read-out process for acquiring average-value data of each gray-scale density is set for a left-side sampling position corresponding to the left side of the four-channel output CCD 34 in FIG. 10. Thus, an image data read-in operation of the scanner unit 4 is started.

In this case, the setting is effected such that the image data is passed through the filtering process at the front stage of the process blocks so that raw image data from the scanner unit 4 can be read out. After the read-in is finished, it is confirmed that an end flag is set for the above-described gray-scale pattern read-out process in the image process ASIC 84. The value in the each-gray-scale data register storing the average value read out for each gray scale corresponding to each gray-scale density is then read out by the access by the base section CPU 311, and the read-out data is retained.

Subsequently, a gray-scale pattern read-out process for acquiring average-value data of each gray-scale density is set for a right-side sampling position corresponding to the right side of the four-channel output CCD 34 in FIG. 10. Thus, an image data read-in operation of the scanner unit 4 is started.

In this case, too, the setting is effected such that the image data is passed through the filtering process at the front stage of the process blocks so that raw image data from the scanner unit 4 can be read out. After the read-in is finished, it is confirmed that an end flag is set for the above-described gray-scale pattern read-out process in the image process ASIC 84. The value in the each-gray-scale data register storing the average value read out for each gray scale corresponding to each gray-scale density is then read out by the access by the base section CPU 311, and the read-out data is retained.

Thereby, individual average values for left and right each-gray-scale data are acquired by the base section CPU 311.

An error in the average values for left and right each-gray-scale data is corrected by the calculation process. The read gray-scale data corresponding to the right side of the four-channel output CCD34 is compared to the previously read gray-scale data corresponding to the left side of the four-channel output CCD 34. Adopting the gray-scale data of the left side of the four-channel output CCD 34 as reference data, the correction process calculation is performed based on the error in density of each data, thereby calculating correction data. The correction data is set on the left-and-right correction table of memory 180 in the left-and-right correction circuit 160 by the base section CPU 311. The series of these processes is automatically performed.

The calculation process for the correction data will now be described.

The respective read left-and-right gray-scale data (33 gray-sales assumed here) is converted to 256 scales (minimum resolution in 8 bits) by an interpolation operation using a least square method. Thereby, a density error of the scanner unit 4 for each of left-and-right image data can be corrected more finely. In this case, the left-side image data is used as reference data, and the right-side image data is corrected to conform to the left-side characteristics.

Figure 15:
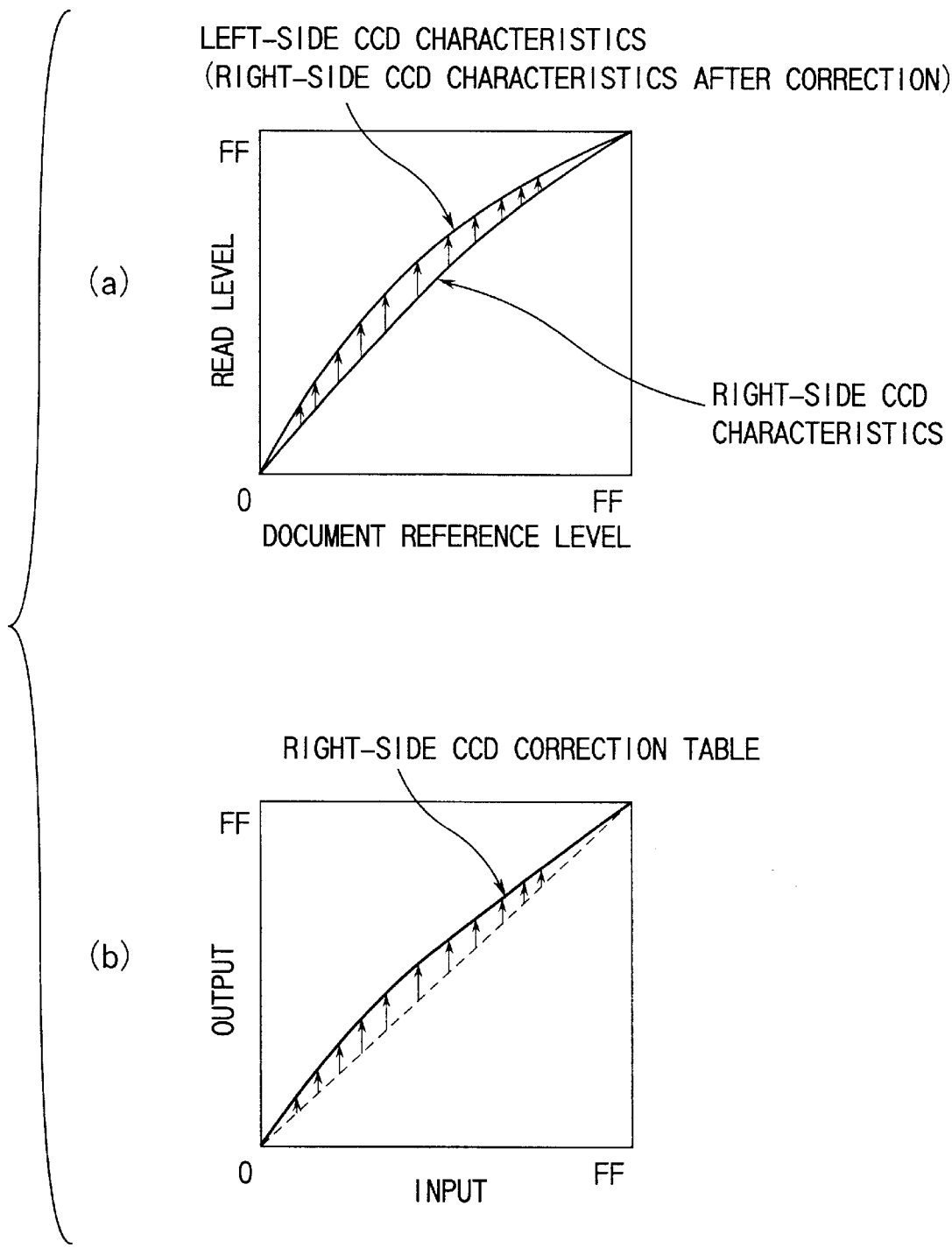
FIG. 15 shows an example of correction by a left-reference left-and-right correction circuit.

FIG. 15 shows an example in which correction is made in the left-and-right correction circuit 169 with the left side set as reference.

FIG. 15(a) shows a result in which the left-and-right characteristics are equalized after the process. FIG. 15(b) shows left-and-right read error data which is set on the left-and-right correction table in memory 180 in order to make correction, as shown in FIG. 15(a). The values on the left-and-right correction table in memory 180 are stored as machine adjustment values in an NVRAM (not shown) and are set on the left-and-right table in memory 180 at the time of the copying operation. In the case of a product which does not require adjustment of left-and-right correction of such a finer error, it may be considered that left-and-right correction is made within an error range found from know-how, etc. Accordingly, correction may be made by one-side offset from the left-and-right gray-scale data through calculation processes for an average error, minimum error and maximum error.

FIG. 16 shows an example in which correction is made by the left-and-right correction circuit 160 with the offset alone.

FIG. 16(a) shows a result in which left-and-right characteristics after processing have come closer to left-side CCD characteristics by the offset correction. FIG. 16(b) shows offset data based on an average left-and-right read error, which is set on the left-and-right correction table in the memory 180 in order to make the characteristics closer to the left-side CCD characteristics.

The present embodiment can be extended to a method of correcting gray-scale characteristics by preparing a left-and-right correction table in the memory 180 for correcting not only left-and-right pixel data but also divided CCD characteristic data. In this case, the read gray-scale data (33 scales assumed here) is converted to 256 scales and an interpolation process is made by using a least square method, etc. Then, in order to make the output from the scanner unit 4 linear, correction is made by using an approximate correction curve (exponential function, log function, etc.) of each image data. In addition, the embodiment can be extended to correction of a correction table on the printer unit (6) side, too, by setting correction characteristics on a table.

As has been described above, according to the embodiment of the present invention, even in a case where devices with different left-and-right sensor characteristics in the main scan direction are used because of the constitution of the pre-processing system using the four-channel output CCD capable of high-speed operations, automatic correction is performed with use of the left-and-right image data correction circuit of this invention. Thereby, no variance in left-and-right CCD characteristics occurs due to a difference in CCD devices, and stable image density reproduction with no left-and-right density error among devices can be achieved.

As has been described above, the present invention can provide an image information processing apparatus, an image information processing method and an image forming apparatus, wherein when a four-channel output CCD is used, a left and right correction circuit in which adjustment for correction is made clear is used for correction, whereby a variance in cdd characteristics of the left and right due to a difference in CCD devices is eliminated and a stable image density free of a density error between the left and right devices can be reproduced.

What is claimed is:

1. An image information processing apparatus for performing an information process on information read by a four-channel output CCD, the apparatus comprising:

accumulation means for reading an image on a pattern document having a plurality of gray scales and accumulating photoelectrically converted electric signals (OS1 to OS4) of the image in a one-line element;

a four-channel output CCD having a first output section for outputting the electric signals (OS1) accumulated in the accumulation means from a first end portion of the one-line element at even intervals, a second output section for outputting the electric signals (OS2) accumulated in the accumulation means from the first end portion of the one-line element at odd intervals, a third output section for outputting the electric signals (OS3) accumulated in the accumulation means from a second end portion of the one-line element at even intervals, and a fourth output section for outputting the electric signals (OS4) accumulated in the accumulation means from the second end portion of the one-line element at even intervals;

correction amount determination means for comparing the electric signals (OS1, OS2) from the first end portion, received from the four-channel output CCD, and the electric signals (OS3, OS4) from the second end portion, detecting deviations for the respective gray scales of the pattern document, finding an average of the deviations and determining the average value to be a correction amount; and correction means for correcting the deviations between the electric signals (OS1, OS2) from the first end portion of the four-channel output CCD and the electric signals (OS3, OS4) from the second end portion, on the basis of the correction amount determined by the correction amount determination means.

2. An image information processing method for performing an information process on information read by a four-channel output CCD, the method comprising:

an accumulation step for reading an image on a pattern document having a plurality of gray scales and accumulating photoelectrically converted electric signals (OS1 to OS4) of the image in a one-line element;

a four-channel output step having an output step for outputting the electric signals (OS1) accumulated in the accumulation step from a first end portion of the one-line element at even intervals, an output step for outputting the electric signals (OS2) accumulated in the accumulation step from the first end portion of the one-line element at odd intervals, an output step for outputting the electric signals (OS3) accumulated in the accumulation step from a second end portion of the one-line element at even intervals, and an output step for outputting the electric signals (OS4) accumulated in the accumulation step from the second end portion of the one-line element at even intervals;

a correction amount determination step for comparing the electric signals (OS1, OS2) from the first end portion, output in the four-channel output step, and the electric signals (OS3, OS4) from the second end portion, detecting deviations for the respective gray scales of the pattern document, finding an average value of the deviations, and determining the average value to be a correction amount; and a correction step for correcting the deviations between the electric signals (OS1, OS2) from the first end portion of the four-channel output CCD and the electric signals (OS3, OS4) from the second end portion, on the basis of the correction amount determined by the correction amount determination step.

3. An image forming apparatus for performing an information process on information read by a four-channel output CCD, the apparatus comprising:

accumulation means for reading an image on a pattern document having a plurality of gray scales and accumulating photoelectrically converted electric signals (OS1 to OS4) of the image in a one-line element;

a four-channel output CCD having a first output section for outputting the electric signals (OS1) accumulated in the accumulation means from a first end portion of the one-line element at even intervals, a second output section for outputting the electric signals (OS2) accumulated in the accumulation means from the first end portion of the one-line element at odd intervals, a third output section for outputting the electric signals (OS3) accumulated in the accumulation means from a second end portion of the one-line element at even intervals, and a fourth output section for outputting the electric signals (OS4) accumulated in the accumulation means from the second end portion of the one-line element at even intervals;

correction amount determination means for comparing the electric signals (OS1, OS2) from the first end portion, received from the four-channel output CCD, and the electric signals (OS3, OS4) from the second end portion, detecting deviations for the respective gray scales of the pattern document, finding an average of the deviations and determining the average value to be a correction amount;

correction means for correcting the deviations between the electric signals (OS1, OS2) from the first end portion of the four-channel output CCD and the electric signals (OS3, OS4) from the second end portion, on the basis of the correction amount determined by the correction amount determination means; and image forming means for forming an image on a recording medium on the basis of the election means.

4. An image forming apparatus for performing an information process on information read by a four-channel output CCD, the apparatus comprising:

an accumulation section which reads an image on a pattern document having a plurality of gray scales and accumulates photoelectrically converted electric signals (OS1 to OS4) of the image in a one-line element;

a four-channel output CCD having a first output section which outputs the electric signals (OS1) accumulated in the accumulation section from a first end portion of the one-line element at even intervals, a second output section which outputs the electric signals (OS2) accumulated in the accumulation section from the first end portion of the one-line element at odd intervals, a third output section which outputs the electric signals (OS3) accumulated in the accumulation section from a second end portion of the one-line element at even intervals, and a fourth output section which outputs the electric signals (OS4) accumulated in the accumulation section from the second end portion of the one-line element at even intervals;

a correction amount determination section which compares the electric signals (OS1, OS2) from the first end portion, received from the four-channel output CCD and the electric signals (OS3, OS4) from the second end portion, detects deviations for the respective gray scales of the pattern document, finds an average of the deviations and determines the average value to be a correction amount;

a correction section which corrects the deviations between the electric signals (OS1, OS2) from the first end portion of the four-channel output CCD and the electric signals (OS3, OS4) from the second end portion, on the basis of the correction amount determined by the correction amount determination section; and an image forming section which forms an image on a recording medium on the basis of the electric signals corrected by the correction section.

5. A method for performing an information process on information read by a four-channel output CCD, the method comprising:

reading an image on a pattern document having a plurality of gray scales and accumulating photoelectrically converted electric signals (OS1 to OS4) of the image in a one-line element;

providing a four-channel output CCD having a first output section for outputting the accumulated electric signals (OS1) from a first end portion of the one-line element at even intervals, a second output section for outputting the accumulated electric signals (OS2) from the first end portion of the one-line element at odd intervals, a third output section for outputting the accumulated electric signals (OS3) from a second end portion of the one-line element at even intervals, and a fourth output section for outputting the accumulated electric signals (OS4) from the second end portion of the one-line element at even intervals;

comparing the electric signals (OS1, OS2) from the first end portion, received from the four-channel output CCD, and the electric signals (OS3, OS4) from the second end portion, detecting deviations for the respective gray scales of the pattern document, finding an average of the deviations and determining the average value to be a correction amount;

correcting the deviations between the electric signals (OS1, OS2) from the first end portion of the four-channel output CCD and the electric signals (OS3, OS4) from the second end portion, on the basis of the correction amount; and forming an image on a recordng medium oa the basis of the corrected deviations.

* * * * *